(12) United States Patent
Kasuya

(10) Patent No.: US 11,146,709 B2
(45) Date of Patent: Oct. 12, 2021

(54) IMAGE READING APPARATUS, CONTROL METHOD FOR CONTROLLING IMAGE READING APPARATUS, AND STORAGE MEDIUM

(71) Applicant: CANON KABUSHIKI KAISHA, Tokyo (JP)

(72) Inventor: Kenji Kasuya, Kashiwa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 16/710,744

(22) Filed: Dec. 11, 2019

(65) Prior Publication Data

US 2020/0120230 A1 Apr. 16, 2020

Related U.S. Application Data

(63) Continuation of application No. 15/877,248, filed on Jan. 22, 2018, now Pat. No. 10,542,175.

(30) Foreign Application Priority Data

Jan. 27, 2017 (JP) .............................. JP2017-012774

(51) Int. Cl.
*H04N 1/203* (2006.01)
*H04N 1/12* (2006.01)
(Continued)

(52) U.S. Cl.
CPC ......... *H04N 1/2032* (2013.01); *H04N 1/0402* (2013.01); *H04N 1/1008* (2013.01); *H04N 1/12* (2013.01)

(58) Field of Classification Search
CPC .................................................. H04N 1/2032
(Continued)

(56) References Cited

U.S. PATENT DOCUMENTS 5,592,576 A * 1/1997 Hayashi ............. H04N 1/00795
355/23
2013/0308166 A1* 11/2013 Uchidate ............ H04N 1/00864
358/3.28

(Continued)

FOREIGN PATENT DOCUMENTS

JP 2002-290678 A 10/2002
JP 2007-272780 A 10/2007

(Continued)

*Primary Examiner* — Jacky X Zheng
(74) *Attorney, Agent, or Firm* — Canon U.S.A., Inc. IP Division

(57) ABSTRACT

An image reading apparatus includes a conveying unit to convey a document, first and second reading units, a reception unit, a selection unit, and a setting unit. The first reading unit generates image data form a document first side and the second reading unit generates image data from a second side in parallel with the first reading unit reading. The reception unit receives settings regarding a size, an orientation, and a document opening direction of the document. The selection unit selects either a first reading method causing the first and second reading units to read per the set size, and a second reading method causing the first reading unit to read the first side per the set size and causing the second reading unit to read an entire second side. The setting unit sets image data corresponding to the document second side reading by the second reading method.

15 Claims, 16 Drawing Sheets

(51) Int. Cl.
*H04N 1/10* (2006.01)
*H04N 1/04* (2006.01)

(58) Field of Classification Search
USPC .......................................................... 358/1.12
See application file for complete search history.

(56) References Cited

U.S. PATENT DOCUMENTS

2014/0160515 A1* 6/2014 Goda ................ H04N 1/00811
358/1.14
2016/0261758 A1* 9/2016 Kimura ................ H04N 1/0032

FOREIGN PATENT DOCUMENTS

| JP | 2008-187668 A | 8/2008 |
| JP | 2008-219556 A | 9/2008 |
| JP | 2010-098497 A | 4/2010 |
| JP | 2014-116650 A | 6/2014 |
| JP | 2016-163168 A | 9/2016 |

* cited by examiner

FIG.5
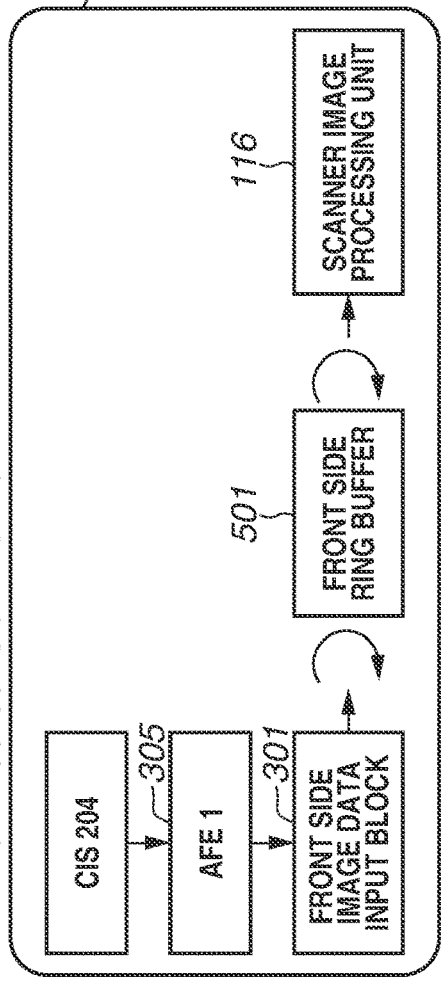
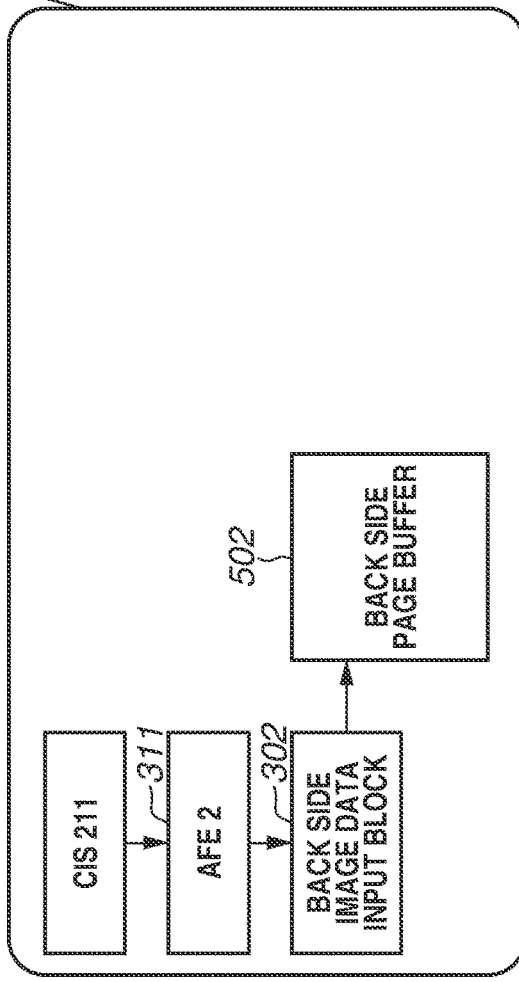
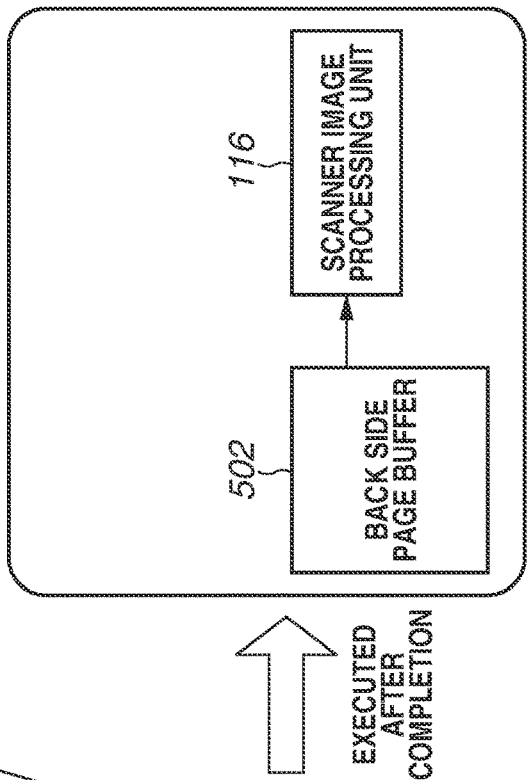

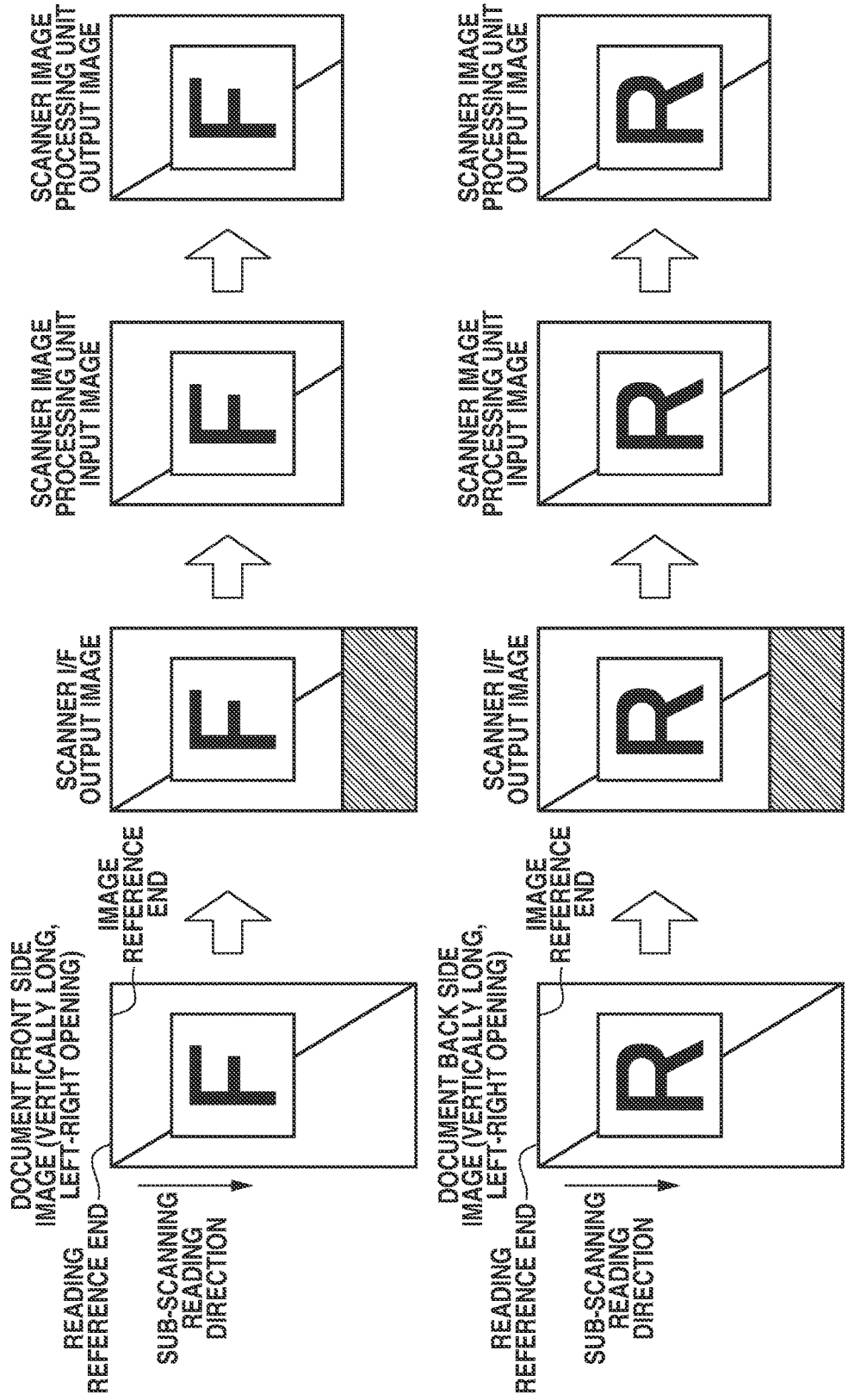

FIG. 8B
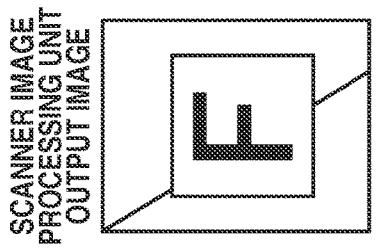
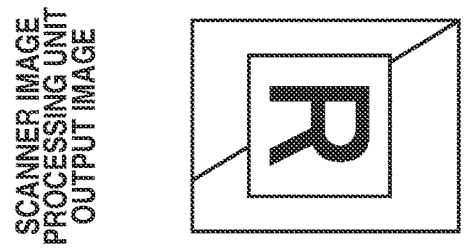
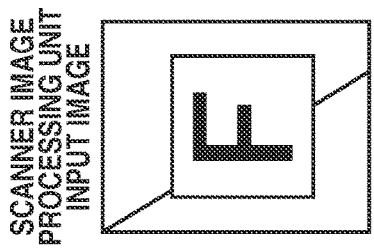
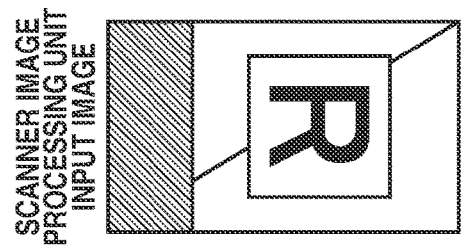
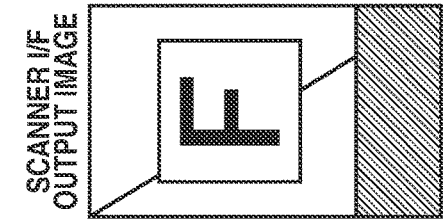
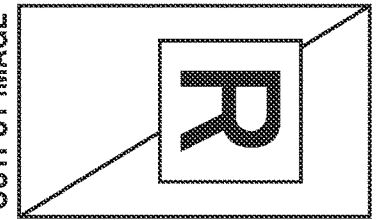
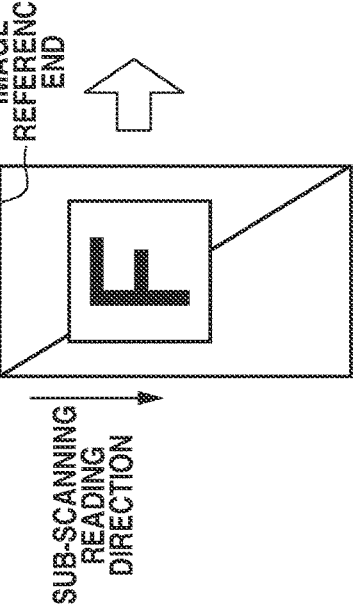
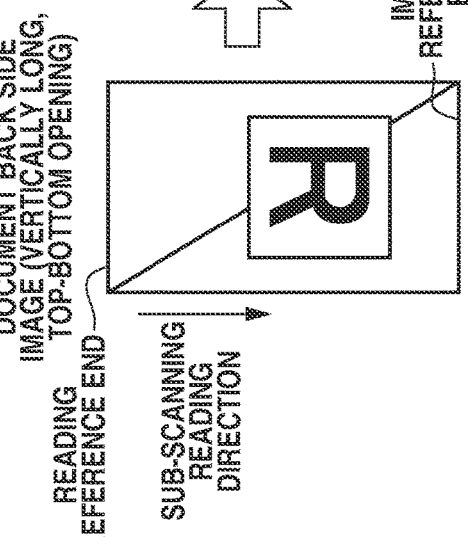

FIG.9A
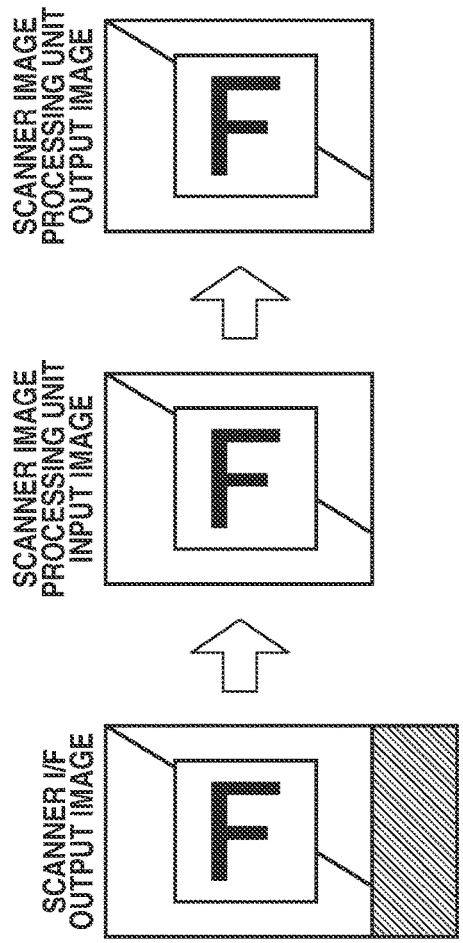
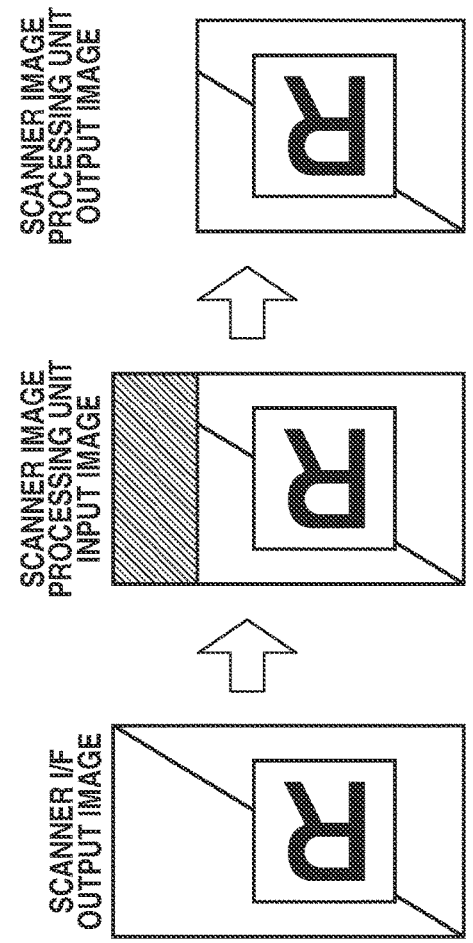

FIG. 9B
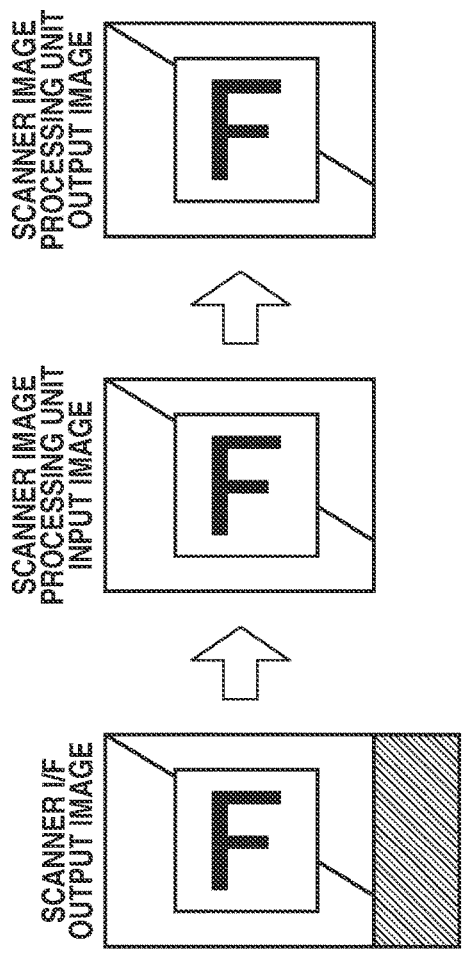
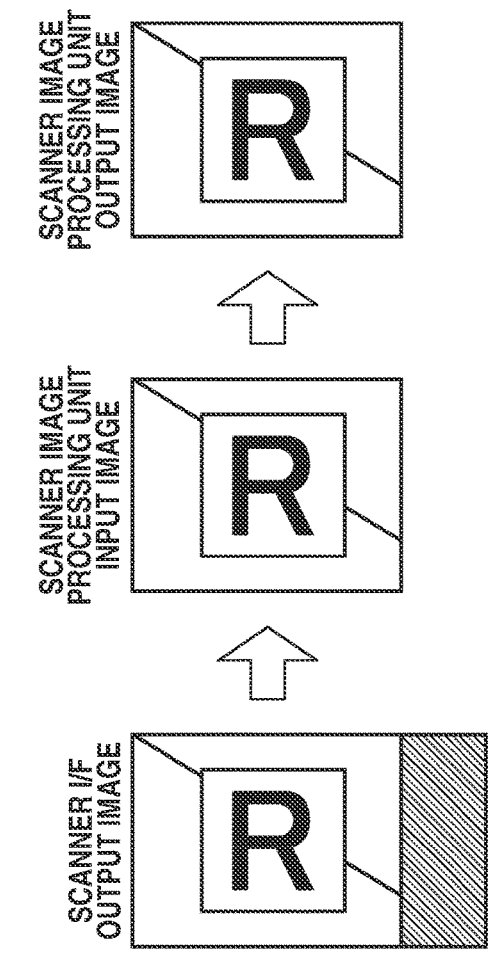
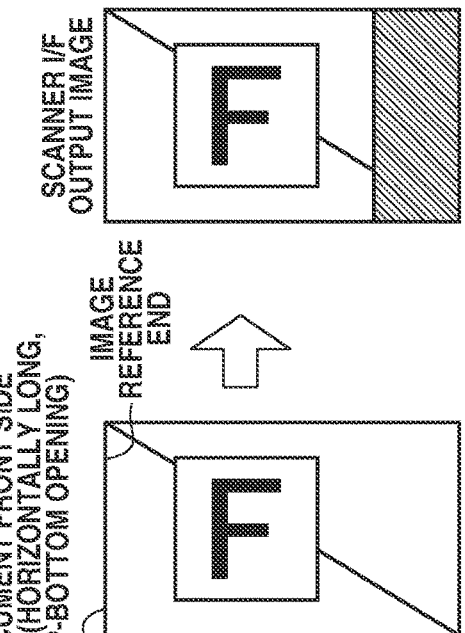
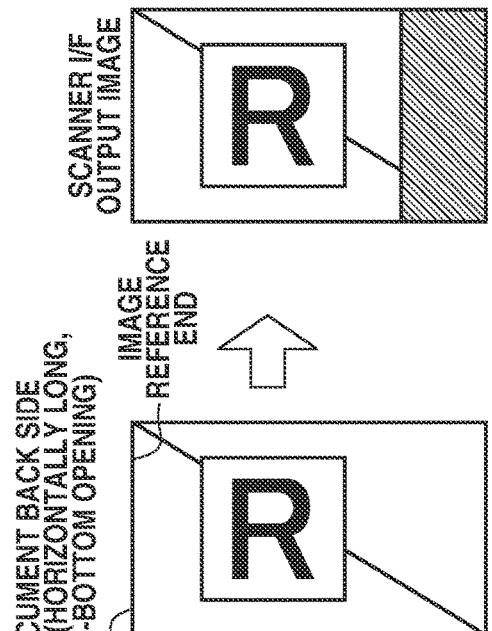

FIG. 10A
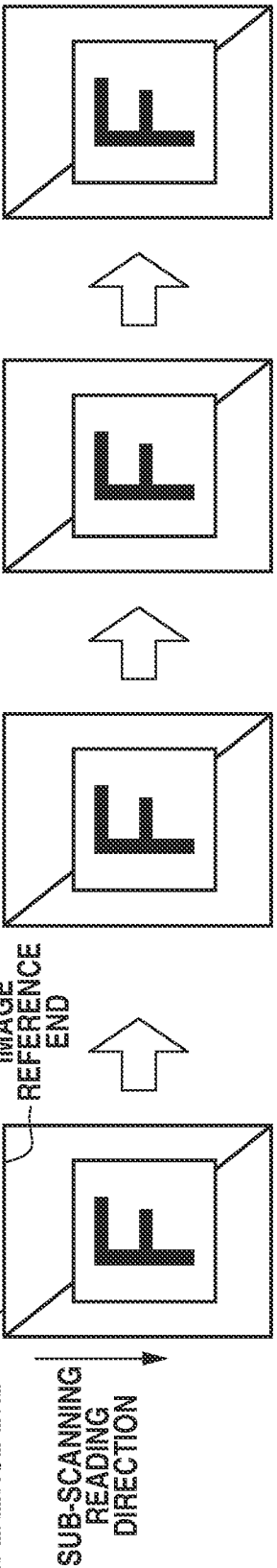
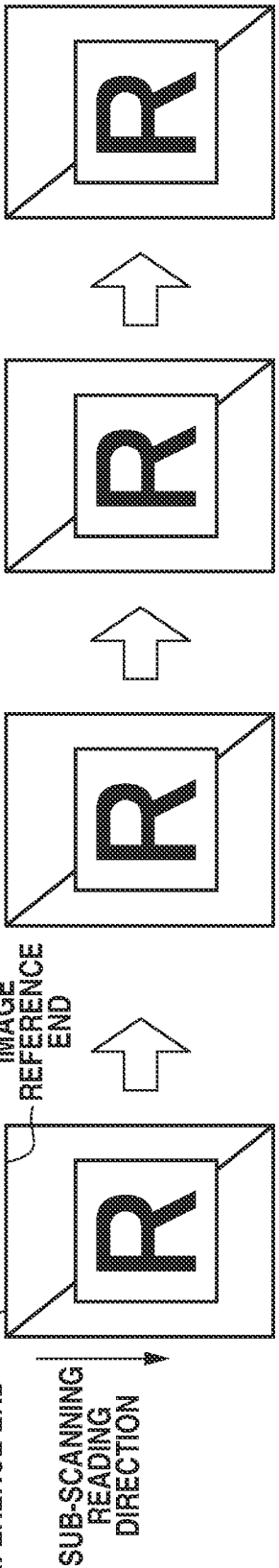

FIG. 10B
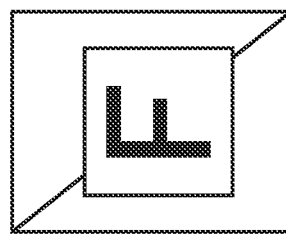
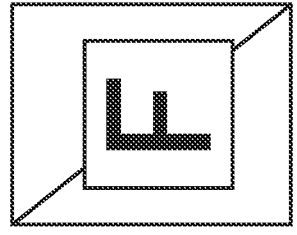
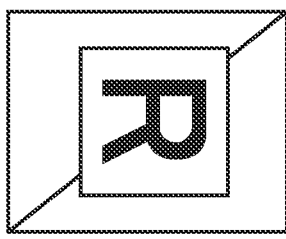
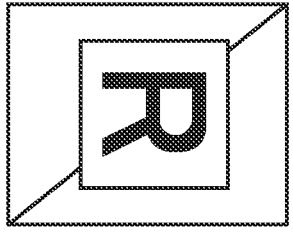
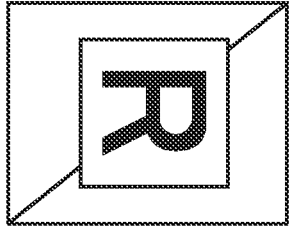
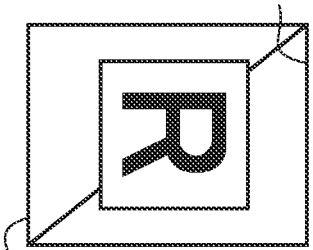
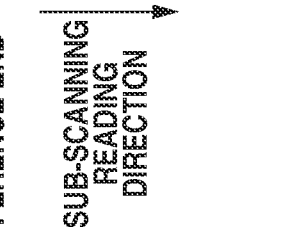

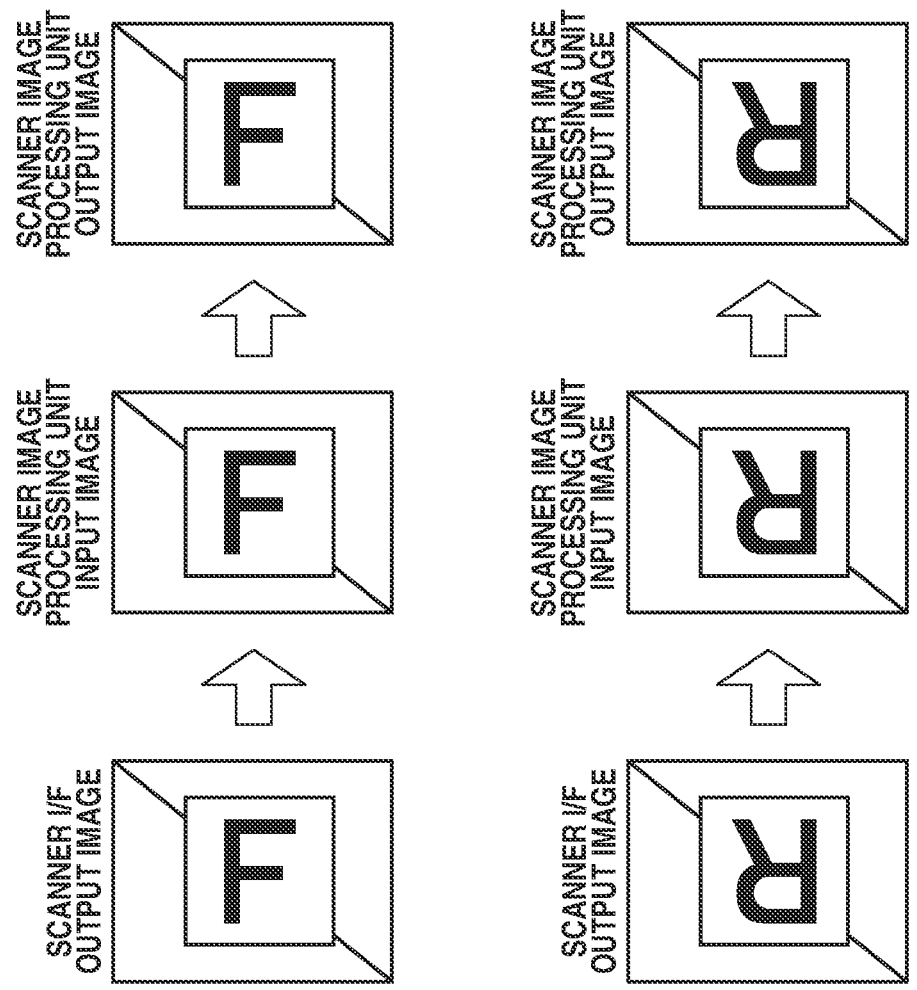

FIG. 11B
EXAMPLES OF OUTPUT IMAGES ACCORDING TO PRESENT EXEMPLARY EMBODIMENT
SPECIFIED DOCUMENT SIZE: LTR
ACTUAL DOCUMENT SIZE: LTR
DOCUMENT ORIENTATION: HORIZONTALLY LONG
OPENING DIRECTION: TOP-BOTTOM OPENING
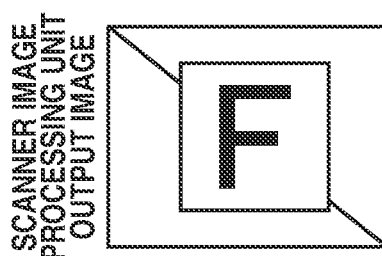
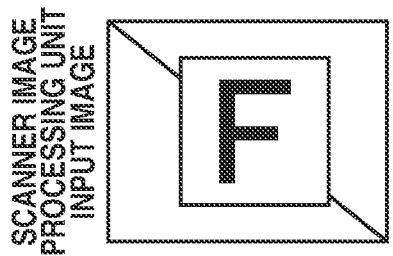
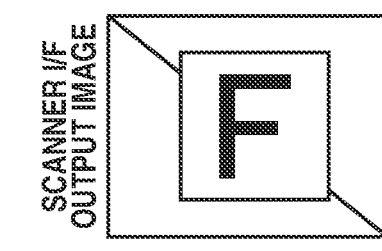
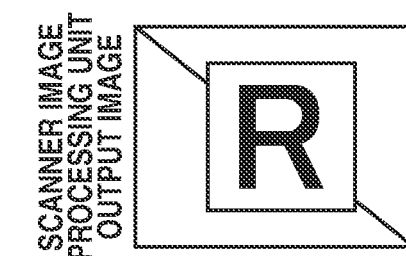
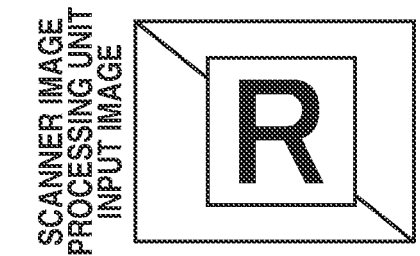
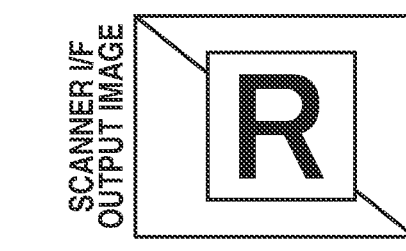

IMAGE READING APPARATUS, CONTROL METHOD FOR CONTROLLING IMAGE READING APPARATUS, AND STORAGE MEDIUM

CROSS REFERENCE TO RELATED APPLICATIONS

This application is a continuation of U.S. patent application Ser. No. 15/877,248, filed on Jan. 22, 2018, which claims priority from Japanese Patent Application No. 2017-012774, filed Jan. 27, 2017, all of which are hereby incorporated by reference herein in their entirety.

BACKGROUND OF THE INVENTION

Field of the Invention

The present disclosure relates to an image reading apparatus and a control method for the image reading apparatus capable of simultaneously reading both sides of a document.

Description of the Related Art

Conventionally, in an image reading unit included in a copying machine or a facsimile machine, or a scanner for inputting data to a computer, an image reading apparatus (an automatic two-sided reading apparatus) for automatically reading image information of both the front and back sides of a sheet document without the intervention of a user is used. Examples of this automatic two-sided reading apparatus include an apparatus in which image sensors are provided on both sides of a document conveying path for front and back sides, thereby automatically reading both sides of a document in a single conveyance of the document. In a document read by such an automatic two-sided reading apparatus, the positional relationship between a reading reference end and an image reference end of the document may be different between the front and back sides, depending on the type of the document orientation (vertically long or horizontally long) or the opening direction of the document (top-bottom opening or left-right opening). See FIGS. 8B and 9A described below.

For example, in a case where an actual document size is larger than a document size specified as a reading setting by a user, and if the above positional relationship is different between the front and back sides, the range of a valid image on the back side is different from that on the front side. Thus, it is not possible to acquire a desired image by a method similar to that for the front side.

Thus, to obtain a desired output result by reading images of such a two-sided document, it is necessary to provide output taking into account the relationship between a front side image and a back side image, such as outputting a back side image corresponding to the output position or the output range of a front side image.

Japanese Patent Application Laid-Open No. 2005-268893 discusses a technique for simultaneously reading images on front and back sides and performing an image conversion process on each side in real time according to the relationship between the front side image and the back side image, thereby generating image data. According to Japanese Patent Application Laid-Open No. 2005-268893, it is possible to obtain an output result in a desired form without reducing productivity.

However, an automatic two-sided reading apparatus discussed in Japanese Patent Application Laid-Open No. 2005-268893 simultaneously reads the front and back sides of a document while performing an image conversion process on each side, thereby outputting read image data in real time. Thus, in the technique discussed in Japanese Patent Application Laid-Open No. 2005-268893, it is necessary to include hardware resources such as a processor capable of executing image conversion processes on front and back sides in parallel, and a document size detection sensor for automatically detecting a document size before the start of reading images. As described above, in the technique discussed in Japanese Patent Application Laid-Open No. 2005-268893, it is necessary to include the above hardware resources. This leads to a complex configuration. Thus, it is difficult to prevent an increase in manufacturing cost.

SUMMARY OF THE INVENTION

An image forming apparatus discussed in the present specification is designed to address the above issue. The present disclosure is directed to providing a mechanism capable of, with a simple configuration, outputting a back side image corresponding to the output position or the output range of a front side image, and thereby a desired output result is obtained.

According to an aspect of the present invention, an image reading apparatus includes a conveying unit configured to convey a document, a first reading unit configured to generate image data by reading an image on a first side of the document conveyed by the conveying unit, a second reading unit configured to generate image data by reading an image on a second side of the document conveyed by the conveying unit, where the second reading unit is able to read the document in parallel with the first reading unit reading the document, a reception unit configured to receive settings regarding a size, an orientation, and an opening direction of the document from a user, a selection unit configured to select, based on the settings received by the reception unit and regarding the orientation and the opening direction of the document, either of a first reading method for causing the first and second reading units to read images on the first and second sides, respectively, of the document according to the size of the document set by the user from a front end of the conveyed document, and a second reading method for causing the first reading unit to read an image on the first side of the document according to the size of the document set by the user from the front end of the conveyed document and for causing the second reading unit to read an entire second side of the conveyed document, and a setting unit configured to set, as valid image data, image data corresponding to the size of the document from a rear end of image data obtained by reading the second side of the document by the second reading method selected by the selection unit.

Further features of the present invention will become apparent from the following description of embodiments with reference to the attached drawings.

BRIEF DESCRIPTION OF THE DRAWINGS

FIG. 5 is a diagram illustrating examples of flows of image data of a front side and image data of a back side.

FIGS. 8A and 8B are diagrams illustrating examples of output images on both sides according to the present embodiment.

FIGS. 9A and 9B are diagrams illustrating examples of output images on both sides according to the present embodiment.

FIGS. 10A and 10B are diagrams illustrating examples of output images on both sides according to the present embodiment.

FIGS. 11A and 11B are diagrams illustrating examples of output images on both sides according to the present embodiment.

DESCRIPTION OF THE EMBODIMENTS

Embodiments for carrying out an image reading apparatus discussed in the specification will be described below with reference to the drawings.

Figure 1:
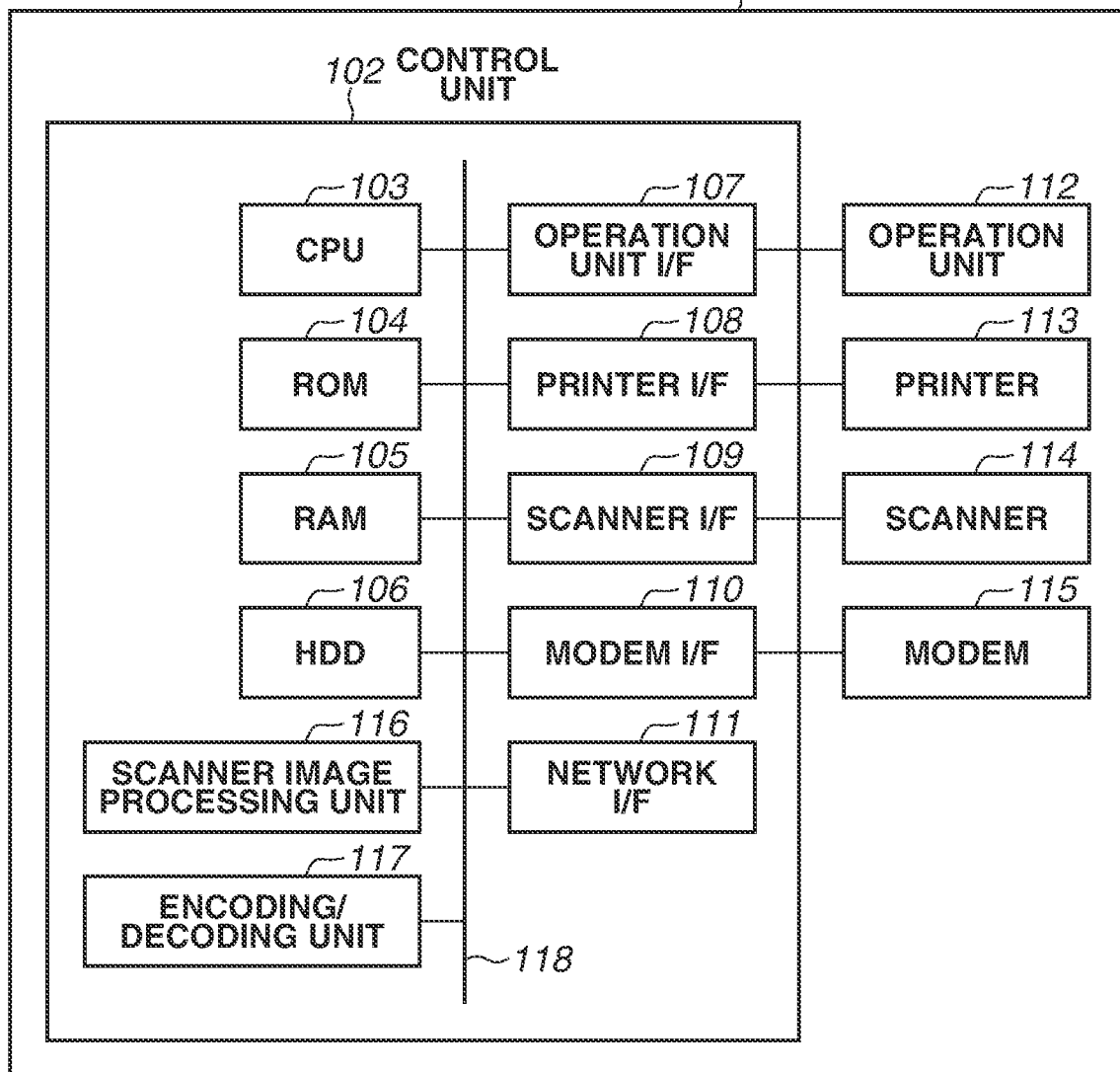
FIG. 1 is a block diagram illustrating an entire image forming apparatus to which an image reading apparatus according to the present embodiment is applicable.

FIG. 1 is a block diagram illustrating an example of a hardware configuration of the entire image forming apparatus 101 to which the image reading apparatus discussed in the specification is applicable.

In FIG. 1, a control unit 102 controls the operation of the entire image forming apparatus 101. In the control unit 102, a central processing unit (CPU) 103 reads a control program stored in a read-only memory (ROM) 104 or a hard disk drive (HDD) 106 and performs various types of control such as reading control, print control, and communication control. A random-access memory (RAM) 105 is used as a temporary storage area such as a main memory or a work area for the CPU 103. The HDD 106 stores image data and various programs. Instead of or in addition to the HDD 106, another storage device such as a solid-state drive (SSD) may be included.

The control unit 102 further includes various interfaces (I/Fs) and a system bus 118. An operation unit I/F 107 connects an operation unit 112 and the control unit 102. The operation unit 112 includes a display panel and a key (a button) (not illustrated) and functions as a reception unit for receiving an operation, an input, and an instruction from a user. A printer I/F 108 connects a printer 113 and the control unit 102. Image data to be printed by the printer 113 is transferred from the control unit 102 to the printer 113 via the printer I/F 108 and printed on a recording material by the printer 113.

A scanner I/F 109 connects a scanner 114 and the control unit 102. The scanner 114 reads an image from a sheet-like document to generate image data and inputs the image data to the control unit 102 via the scanner I/F 109. A scanner image processing unit 116 is a processing unit for executing image processing according to an image processing mode (a color scan mode or a monochrome scan mode) on image data loaded into the RAM 105 by the processing of the scanner I/F 109. The scanner I/F 109 and the scanner image processing unit 116 will be described in detail below.

An encoding/decoding unit 117 is a processing unit for executing a compression/decompression process on image data compliant with a predetermined standard such as Joint Photographic Experts Group (JPEG) or Joint Bi-level Image Experts Group (JBIG). A modem I/F 110 connects a modem 115 and the control unit 102. The modem 115 is connected to a public line and communicates image data to and from an external facsimile apparatus (not illustrated) through facsimile communication.

A network I/F 111 connects the control unit 102 (the image forming apparatus 101) to a wired local area network (LAN). The image forming apparatus 101 can transmit and receive image data and various pieces of information to and from an external apparatus via the network I/F 111. For example, the image forming apparatus 101 can receive print image data from the external apparatus via the network I/F 111 and print the image data using the printer 113, or can transmit image data read by the scanner 114 to the external apparatus. The system bus 118 is a data path for the above components.

As described above, the image forming apparatus 101 according to the present embodiment includes a front side image reading unit (a contact image sensor (CIS) 204) and a back side image reading unit (a CIS 221) on respective sides of a document conveying path and functions as a two-sided image reading apparatus capable of reading both sides of a document conveyed along the conveying path.

Next, with reference to FIG. 2, the configuration of the scanner 114 will be described.

Figure 2:
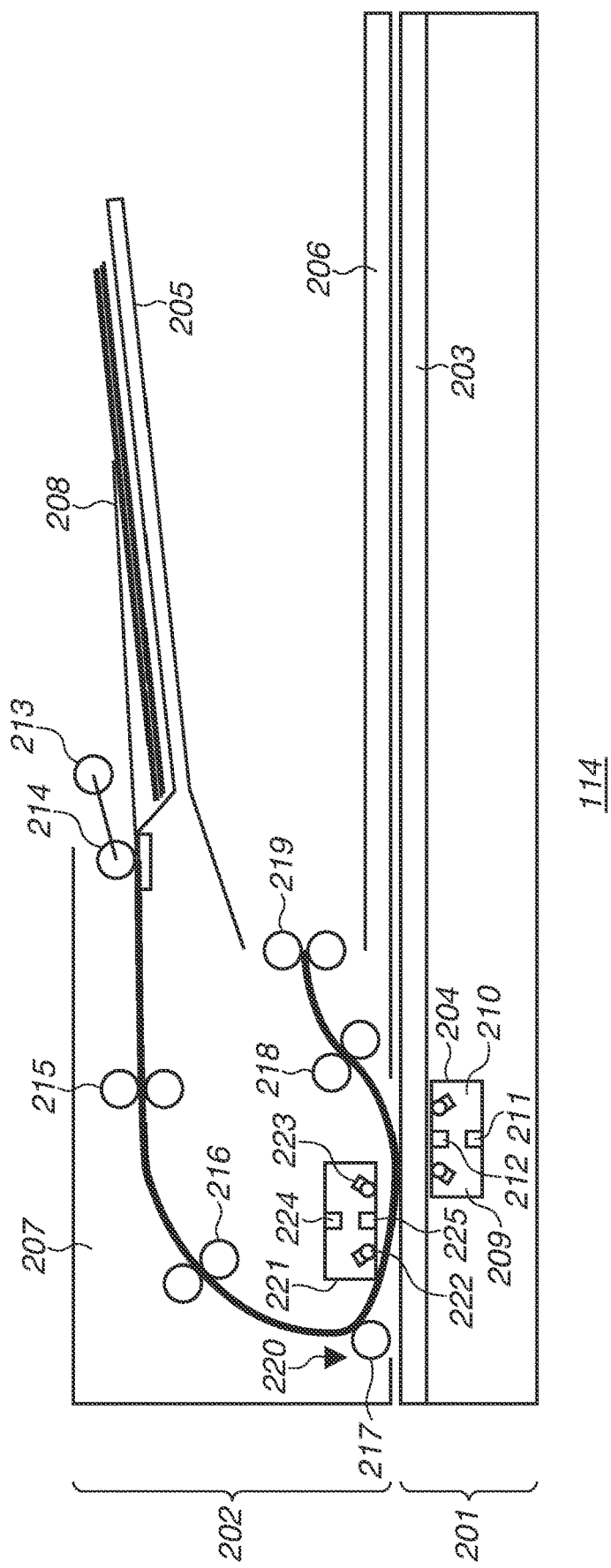
FIG. 2 is a cross-sectional view illustrating an example of a configuration of a scanner unit.

FIG. 2 is a cross-sectional view illustrating an example of the configuration of the scanner 114.

As illustrated in FIG. 2, the scanner 114 includes a scanner lower portion 201 and a scanner upper portion 202.

The scanner lower portion 201 includes a document platen 203 and a CIS 204. The document platen 203 is composed of a transparent plate such as a glass plate.

The scanner upper portion 202 includes a document tray 205, a sheet discharge tray 206, and an automatic document feeder (ADF) 207.

The document tray 205, the sheet discharge tray 206, and the ADF 207 of the scanner upper portion 202 are formed in an integrated manner. A document (sheet) 208 placed on the document tray 205 is introduced into the ADF 207, and an image on the document 208 is read by the ADF 207. Then, the document 208 is discharged to the sheet discharge tray 206. The scanner 114 can perform one-sided reading and two-sided reading of the document 208 using the ADF 207. The scanner upper portion 202 can open and close relative to the scanner lower portion 201 by an opening/closing mechanism (not illustrated). The opening and closing of the scanner upper portion 202 allows the scanner 114 to read an image on a document placed on the document platen 203, without using the ADF 207.

The CIS 204 of the scanner lower portion 201 functions as an image reading unit for reading one side of the document 208. In the present embodiment, a side (a first side) to be read by the CIS 204 is defined as a "front side". Thus, an upper side of the document 208 placed on the document tray 205 is the front side. Further, a side (a second side) opposite to the front side is defined as a "back side".

The CIS 204 includes a pair of light-emitting diode (LED) light sources 209 and 210 as an irradiation unit, a photoelectric conversion unit 211, and a lens 212. Light emitted from the LED light sources 209 and 210 is reflected by the front side of the document 208 introduced into the scanner 114 by the ADF 207 or the front side of the document placed on the document platen 203, and the reflected light is input to the photoelectric conversion unit 211 through the lens 212. The photoelectric conversion unit 211 converts the input reflected light into an electric signal, thereby generating image data.

The LED light source 209 includes a plurality of LED elements arranged along a main scanning direction (the depth direction in FIG. 2) and a light-guiding member. Similarly, the LED light source 210 also includes a plurality of LED elements arranged along the main scanning direction and a light-guiding member. The LED light sources 209 and 210 irradiate the front side of the document through the light-guiding members with light emitted from the LED elements.

The photoelectric conversion unit 211 includes a plurality of photoelectric elements arranged along the main scanning direction. The CIS 204 having such a configuration is provided to be movable in a sub-scanning direction (the left-right direction in FIG. 2) below the document platen 203. In a case where a document is placed on the document platen 203, the CIS 204 moves in the sub-scanning direction and reads an image on the document. Further, in a case where the document 208 is introduced into the scanner 114 by the ADF 207, the CIS 204 in a stopped state reads an image on the document 208 conveyed by the ADF 207.

The ADF 207 of the scanner upper portion 202 functions as a document conveying unit. The ADF 207 conveys documents placed on the document tray 205 one by one to the sheet discharge tray 206. To this end, the ADF 207 includes a pickup roller 213, a separation unit 214, first registration rollers 215, second registration rollers 216, a first conveying roller 217, second conveying rollers 218, and sheet discharge rollers 219 along the conveying path. Additionally, the ADF 207 includes a document detection sensor 220, which detects the front and rear ends of each conveyed document, and a CIS 221.

The CIS 221 of the scanner upper portion 202 functions as an image reading unit for reading the other side, i.e., the back side, of the document 208. The CIS 221 includes a pair of LED light sources 222 and 223 as an irradiation unit, a photoelectric conversion unit 224, and a lens 225. Light emitted from the LED light sources 222 and 223 is reflected by the back side of the document 208 introduced into the scanner 114 by the ADF 207, and the reflected light is input to the photoelectric conversion unit 224 through the lens 225.

The photoelectric conversion unit 224 converts the input reflected light into an electric signal, thereby generating image data. The LED light source 222 includes a plurality of LED elements arranged along the main scanning direction and a light-guiding member. Similarly, the LED light source 223 also includes a plurality of LED elements arranged along the main scanning direction and a light-guiding member. The LED light sources 222 and 223 irradiate the back side of the document 208 through the light-guiding members with light emitted from the LED elements. The photoelectric conversion unit 224 includes a plurality of photoelectric elements arranged along the main scanning direction.

The document 208 placed on the document tray 205 is introduced into the ADF 207 by the pickup roller 213. The separation unit 214 is configured to include a separation roller above and a separation pad below in FIG. 2 and separates documents introduced by the pickup roller 213 one by one. Documents can be successively introduced into the ADF 207 one by one by the pickup roller 213 and the separation unit 214. The first registration rollers 215 correct the skew of each introduced document. The document the skew of which has been corrected is conveyed to an image reading position of the CIS 204 and the CIS 221 by the second registration rollers 216 and the first conveying roller 217.

To read only the front side of the document 208, the CIS 204 reads a front side image. Further, to read both the front and back sides of the document 208, the CIS 204 reads a front side image, and the CIS 221 reads a back side image. The document 208 on which images are read by the CIS 204 and the CIS 221 is discharged to the sheet discharge tray 206 by the second conveying rollers 218 and the sheet discharge rollers 219.

In the process of conveying and reading a document using the ADF 207, and based on signals (not illustrated) output at the timings when the document detection sensor 220 detects the front and rear ends of the document, the CPU 103 calculates a document sub-scanning length.

With the above configuration, the image forming apparatus 101 reads a document image using the scanner 114 by either of a method for reading an image on the document placed on the document platen 203 and a method for reading an image on the document 208 introduced by the ADF 207. When reading an image on the document 208 introduced into the ADF 207, the image forming apparatus 101 can read only an image on the front side of the document 208 or simultaneously read images on the front and back sides (both sides) of the document 208. As described above, the image forming apparatus 101 according to the present embodiment includes an image reading apparatus capable of simultaneously reading both the front and back sides of a document. A description is given below of a configuration in which, even in a case where there are limitations on hardware resources such as an image processing processor and a memory, it is possible, using such an image reading apparatus, to output an image in a desired reading range, taking into account the relationship between the image orientations of the front and back sides of a document.

Figure 3:
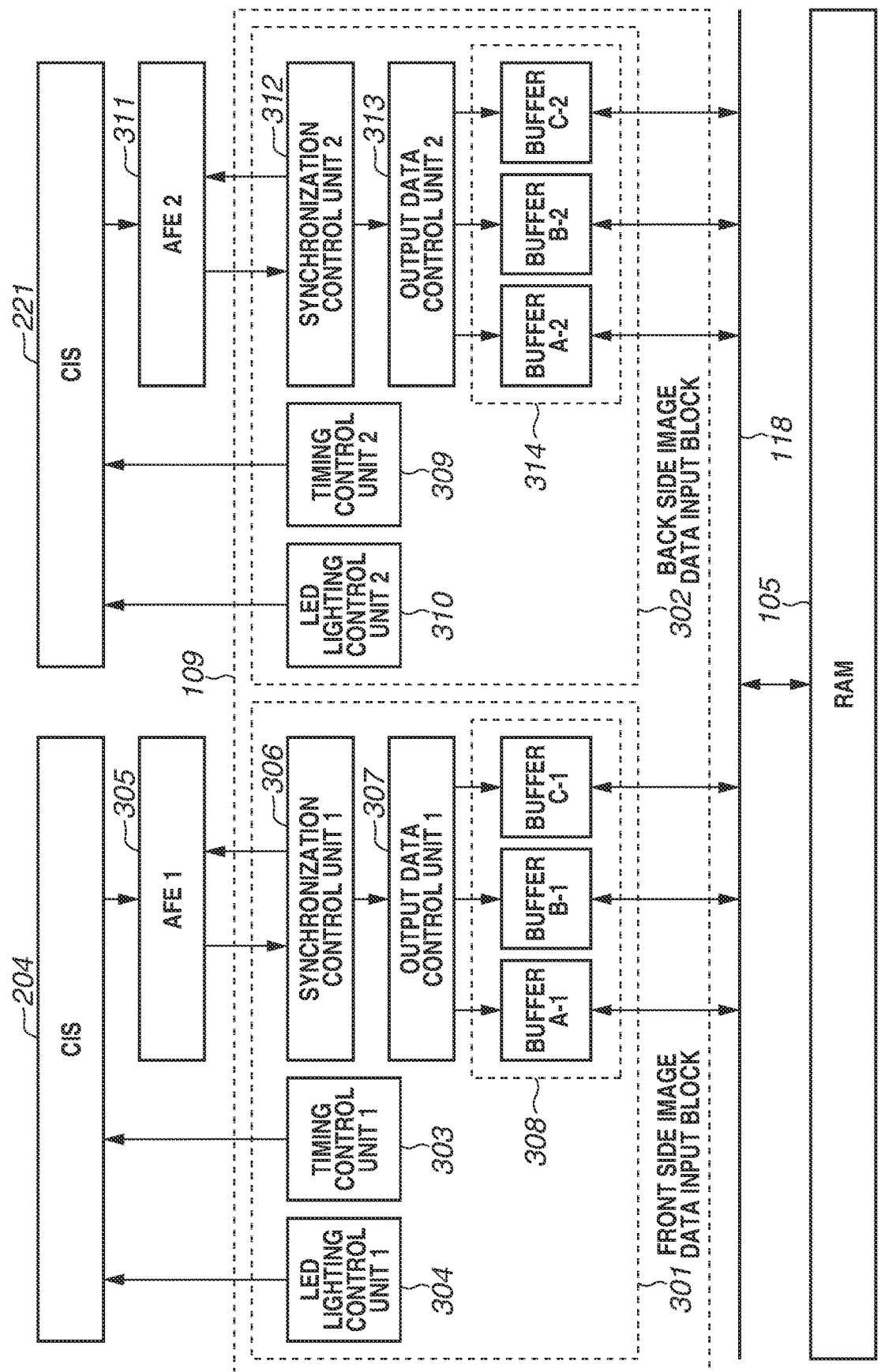
FIG. 3 is a block diagram illustrating an example of a general configuration of a scanner interface (I/F).

FIG. 3 is a block diagram illustrating an example of the general configuration of the scanner I/F 109.

As illustrated in FIG. 3, the scanner I/F 109 includes a front side image data input block 301, which is used to read a document front side image, and a back side image data input block 302, which is used to read a document back side image. In the image forming apparatus 101 according to the present embodiment, image data read by the CIS 204 is input to the front side image data input block 301, and image data read by the CIS 221 is input to the back side image data input block 302.

First, the front side image data input block 301 will be described.

A timing control unit 1 (303) generates a control signal for a reading device according to a reading speed and outputs the control signal to the CIS 204. This device control signal is synchronized with a synchronization signal generated in the scanner I/F 109 and can synchronize a reading timing in the main scanning direction with a reading process.

An LED lighting control unit 1 (304) is a unit for controlling the lighting of the LED light sources 209 and 210, which are the light sources of the CIS 204. The LED lighting control unit 1 (304) controls a synchronization signal and a clock signal for controlling the sequential lighting of the LEDs corresponding to red (R), green (G), and blue (B) color elements, light adjustment according to the CIS 204, and turning on and off of the LEDs 209 and 210. The timing of this control is based on a synchronization signal received from the timing control unit 1 (303), and the lighting of the LED light sources 209 and 210 is controlled in synchronization with the driving of the CIS 204.

An output signal from the CIS 204 is input to an analog front-end (AFE) 1 (305). The AFE 1 (305) performs the process of adjusting the gain of the output signal from the CIS 204 and performing an analog-to-digital (A/D) conversion process on the output signal to convert an analog signal output from the CIS 204 into a digital signal, and then inputting the digital signal to the front side image data input block 301.

A synchronization control unit 1 (306) sets for the AFE 1 (305) a predetermined threshold level according to an analog signal from the CIS 204 and adjusts the level of an output signal due to the difference between image reading devices. Further, the synchronization control unit (306) generates and outputs a synchronization clock for performing sampling control of an analog signal and causing the AFE 1 (305) to output a digital signal. Then, the synchronization control unit 1 (306) receives, from the AFE (305), read image data based on a predetermined digital signal. This data is input to an output data control unit 1 (307) via the synchronization control unit 1 (306).

The output data control unit 1 (307) stores image data received from the AFE 1 (305) in a buffer 308 (buffers A-1, B-1, and C-1) according to the output mode of the front side image data input block 301. The image data stored in the buffer 308 is transferred to the RAM 105.

Next, the back side image data input block 302 will be described.

The back side image data input block 302 has a configuration similar to that of the front side image data input block 301. A timing control unit 2 (309) generates a control signal for a reading device according to a reading speed and outputs the control signal to the CIS 221. This device control signal is synchronized with a synchronization signal generated in the scanner I/F 109 and can synchronize a reading timing in the main scanning direction with a reading process.

An LED lighting control unit 2 (310) is a unit for controlling the lighting of the LEDs 222 and 223, which are the light sources of the CIS 221. The LED lighting control unit 2 (310) controls a synchronization signal and a clock signal for controlling the sequential lighting of the LEDs corresponding to red (R), green (G), and blue (B) color elements, light adjustment according to the CIS 221, and turning on and off of the LEDs 222 and 223. The timing of this control is based on a synchronization signal received from the timing control unit 2 (309), and the lighting of the LEDs 222 and 223 is controlled in synchronization with the driving of the CIS 221.

An output signal from the CIS 221 is input to an AFE 2 (311). The AFE 2 (311) performs the process of adjusting the gain of the output signal from the CIS 221 and performing an A/D conversion process on the output signal to convert an analog signal output from the CIS 221 into a digital signal, and then inputting the digital signal to the back side image data input block 302.

A synchronization control unit 2 (312) sets for the AFE 2 (311) a predetermined threshold level according to an analog signal from the CIS 221 and adjusts the level of an output signal due to the difference between image reading devices. Further, the synchronization control unit (312) generates and outputs a synchronization clock for performing sampling control of an analog signal and causing the AFE 2 (311) to output a digital signal. Then, the synchronization control unit 2 (312) receives, from the AFE (311), read image data based on a predetermined digital signal. This data is input to an output data control unit 2 (313) via the synchronization control unit 2 (312).

The output data control unit 2 (313) stores image data received from the AFE 2 (311) in a buffer 314 (buffers A-2, B-2, and C-2) according to the output mode of the back side image data input block 302. The image data stored in the buffer 314 is transferred to the RAM 105.

Next, with reference to FIG. 4, the general configuration of the scanner image processing unit 116 will be described.

Figure 4:
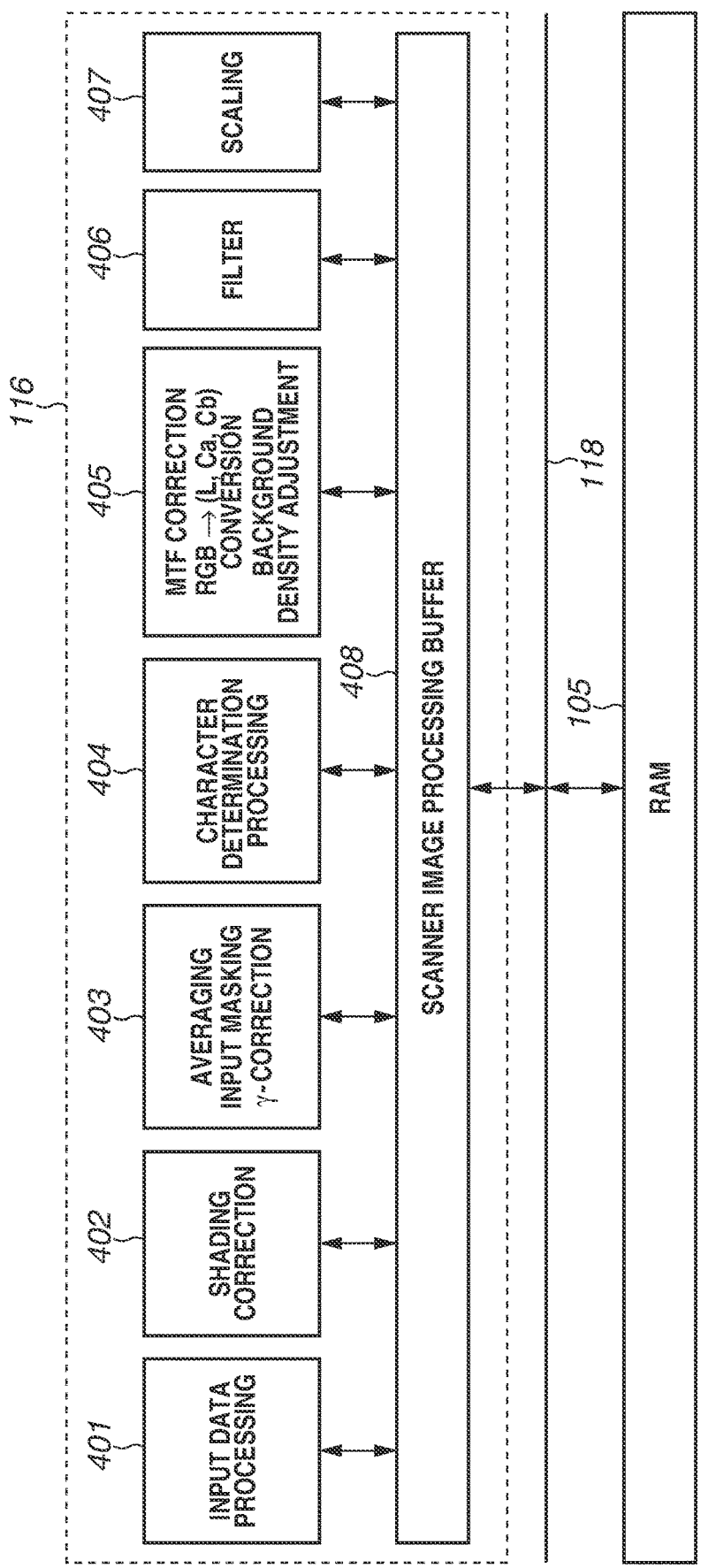
FIG. 4 is a block diagram illustrating an example of a general configuration of a scanner image processing unit.

FIG. 4 is a diagram illustrating an example of the general configuration of the scanner image processing unit 116.

The scanner image processing unit 116 is a processing unit for executing image processing according to an image processing mode (a color scan mode or a monochrome scan mode) on image data loaded into the RAM 105 by the processing of the scanner I/F 109. The scanner image processing unit 116 executes processing according to each image processing mode on data loaded into a scanner image processing buffer 408.

Image data transferred to the RAM 105 as output data of the front side image data input block 301 or the back side image data input block 302 of the scanner I/F 109 is sequentially loaded into the scanner image processing buffer 408 with respect to each predetermined data size. Further, image processing regarding image data of each document surface is exclusively executed on a page-by-page basis.

In FIG. 4, a shading correction block 402 is a processing block for correcting variation in the light amount distribution of the light sources (the LEDs 209, 210, 222, and 223) in the main scanning direction, variation in light-receiving elements of the image reading devices, and the offset of dark output.

An input data processing unit 401 is a processing unit for reconfiguring, as dot sequential data, frame sequential data separated into R, G, and B. Data of a single pixel is stored in the RAM 105 as frame sequential data with respect to each of R, G, and B colors. If these pieces of data are loaded into the scanner image processing buffer 408, the input data processing unit 401 extracts data of a single pixel with respect to each piece of color data and reconfigures the extracted data as RGB data of a single pixel. The input data processing unit 401 performs this reconfiguration process with respect to each pixel, thereby converting frame sequential image data into dot sequential data.

A processing block 403 includes an averaging processing unit, an input masking processing unit, and a γ-correction processing unit. The averaging processing unit is a processing block for performing sub-sampling (simple thinning) for reducing the reading resolution in the main scanning direction, or an averaging process. The input masking processing unit is a processing block for calculating the color correction of input RGB data. The γ-correction processing unit is a processing block for imparting predetermined gradation characteristics to input data.

A character determination processing block 404 is a processing block for distinguishing a black character or distinguishing pixels of a line drawing contour on input image data.

A processing block 405 includes a modulation transfer function (MTF) correction processing unit, an RGB→3f(L, Ca, Cb) conversion processing unit, and a background density adjustment processing unit. The MTF correction processing unit is a processing unit for performing a filter process in the main scanning direction to reduce moiré produced by correcting the MTF difference or reducing the magnification when image reading devices are changed. The MTF correction processing unit is a block for performing a multiplication/addition process on a predetermined pixel in the main scanning direction in a region of interest, using coefficients. The RGB→(L, Ca, Cb) conversion processing unit performs a conversion process on multi-valued image data of R, G, and B colors for filtering (brightness emphasis, saturation emphasis, and color determination) to be performed by a filter processing block 406, which is subsequent to the processing block 405. The background density adjustment processing unit executes the process of automatically recognizing the background density of a document and correcting the background density value to a white side, thereby obtaining binarized data suitable for facsimile communication.

As the process of performing color determination and filtering on data obtained by the RGB→(L, Ca, Cb) conversion processing unit of the processing block 405, the filter processing block 406 performs an edge strength process on the brightness component (L) of an image, and an emphasis process on the saturation (Ca, Cb) of the image. Further, the filter processing block 406 determines the coloration of an input image and outputs the result of the determination. Further, based on a determination signal of a character or a line drawing contour portion generated by the character determination processing block 404, the filter processing block 406 can change a parameter for the amount of emphasis. The data subjected to the filter process is converted from L, Ca, and Cb data to R, G, and B data, and the R, G, and B data is output. When processing monochrome image data, the filter processing block 406 functions as an edge emphasis filter.

A scaling processing block 407 is a processing block for performing a linear interpolation scaling process in the main scanning direction and the sub-scanning direction.

According to a set image processing mode (a copy mode or a scanner mode), the above image processing is sequentially executed on data loaded into the scanner image processing buffer 408.

As described above, the scanner 114 can simultaneously input image data of the front and back sides of a document to the control unit 102, using the CIS 204, the CIS 221, and the front side image data input block 301 and the back side image data input block 302 of the scanner I/F 109. Meanwhile, the scanner image processing unit 116 sequentially processes the image data of the front and back sides on a page-by-page basis.

FIG. 5 is a diagram illustrating examples of the flows of image data of a front side and image data of a back side.

As illustrated in FIG. 5, the image forming apparatus 101 according to the present embodiment executes in parallel the input of image data of front and back sides by the front side image data input block 301 and the back side image data input block 302, and image processing on the front side by the scanner image processing unit 116. That is, the front side of a document is read by the CIS 204 while the read image data is sequentially subjected to image processing by the scanner image processing unit 116. After the image processing on the front side is completed, the image forming apparatus 101 immediately executes image processing on the back side by the scanner image processing unit 116.

The front side image data input block 301 and the scanner image processing unit 116 transmit and receive image data to and from each other using a front side ring buffer 501, thereby executing in parallel the input of front side image data and image processing on the image data. The front side ring buffer 501 is a ring buffer in a predetermined size reserved on the RAM 105.

Meanwhile, back side image data input from the back side image data input block 302 is temporarily accumulated in a back side page buffer 502 (a page buffer reserved on the RAM 105). Then, after the processing on the front side and the input of the back side image data are completed, image processing is executed on the back side image data accumulated in the back side page buffer 502.

Next, with reference to FIGS. 6A to 11B, a description will be given of processing control performed when the image forming apparatus 101 according to the present embodiment performs two-sided reading of a document.

Figure 6A:
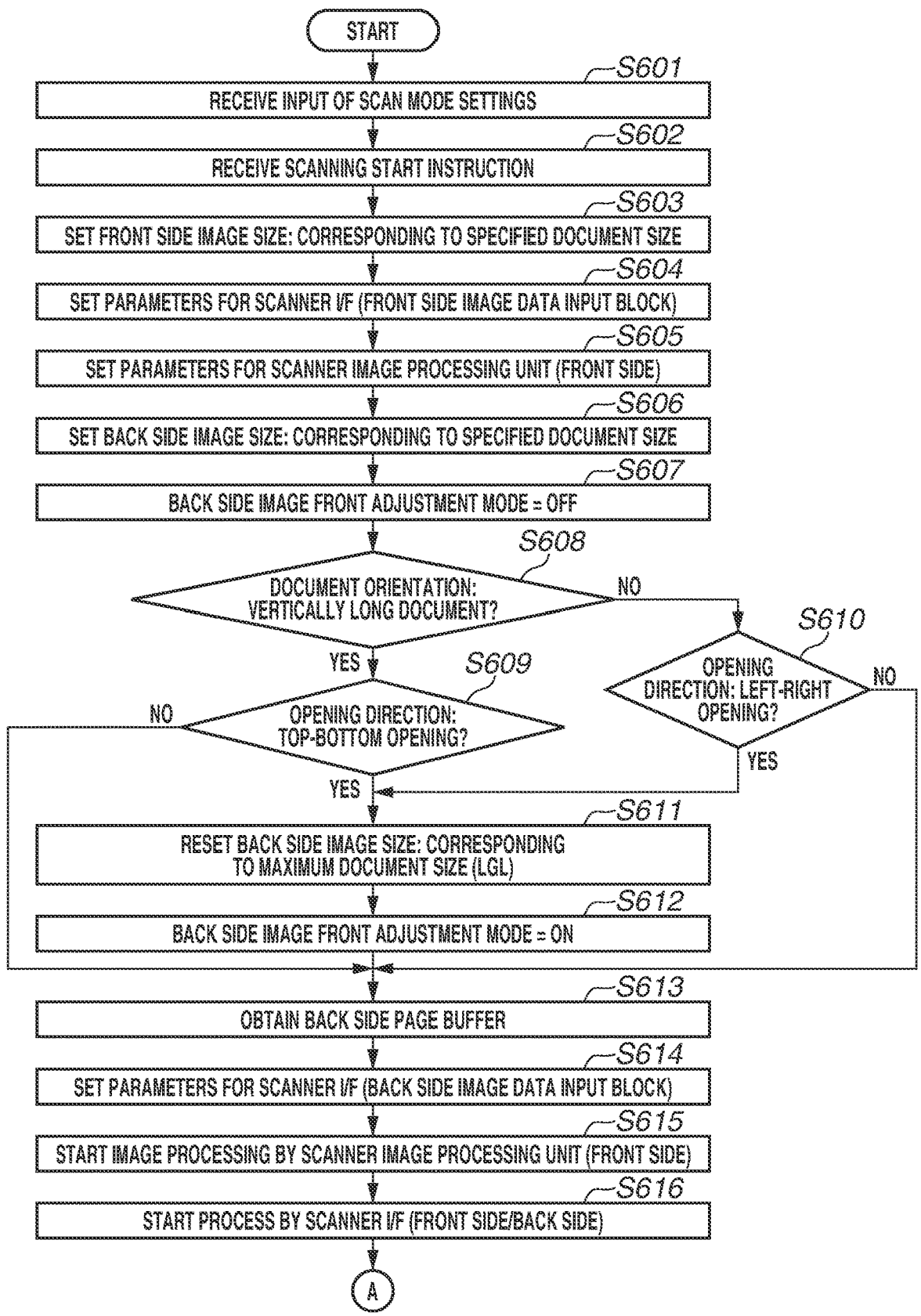
FIGS. 6A and 6B are flowcharts illustrating an example of a two-sided reading process according to the present embodiment.
Figure 6B:
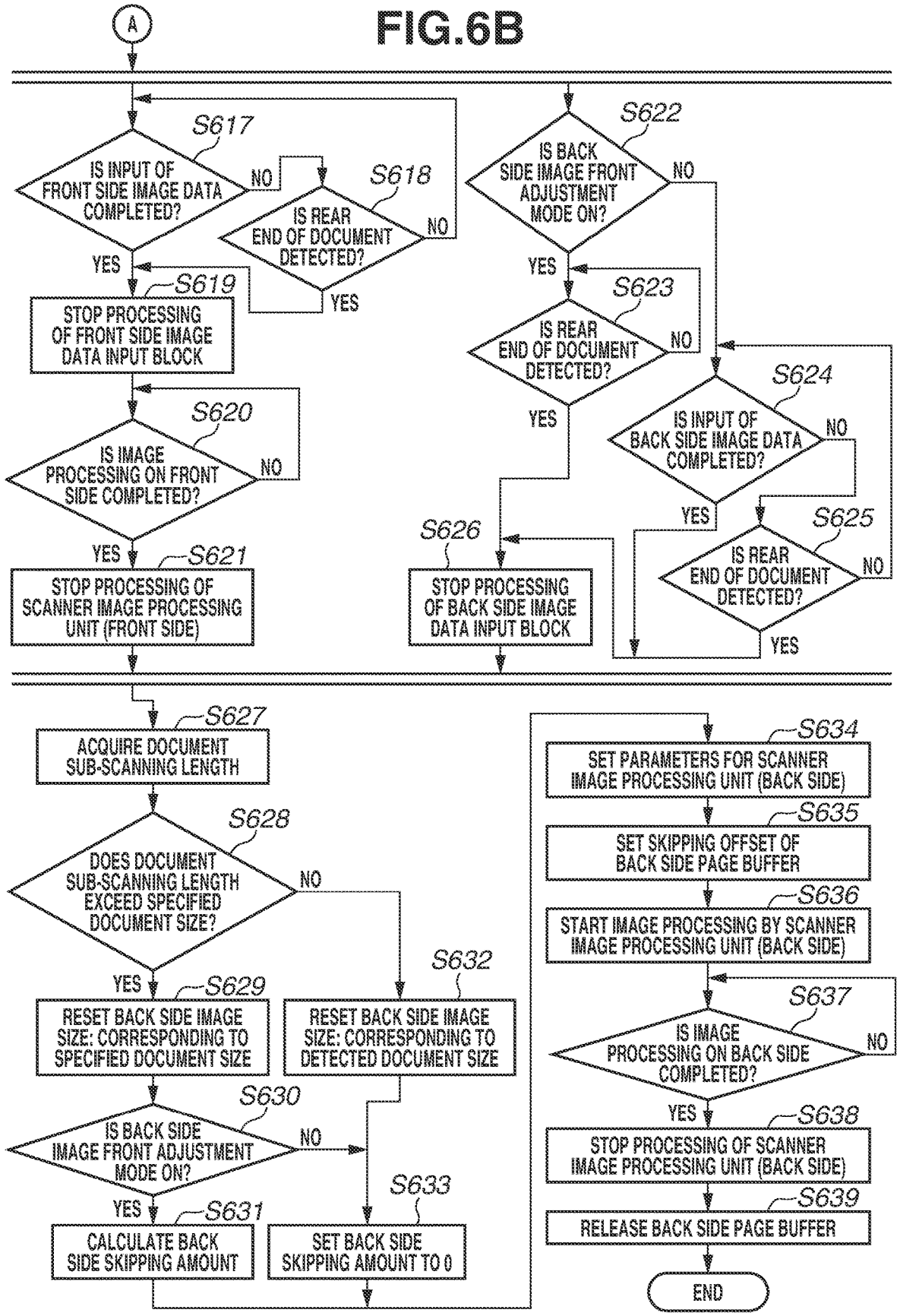

FIGS. 6A and 6B are flowcharts illustrating an example of processing (a two-sided reading control process) performed when the image forming apparatus according to the present embodiment performs two-sided reading of a document. In the description in FIGS. 6A and 6B, each step is designated by "S". Further, the processing illustrated in the flowchart is achieved by the CPU 103 loading a program stored in the ROM 103 or the HDD 106 into the RAM 105, where necessary, and executing the program.

Figure 7A:
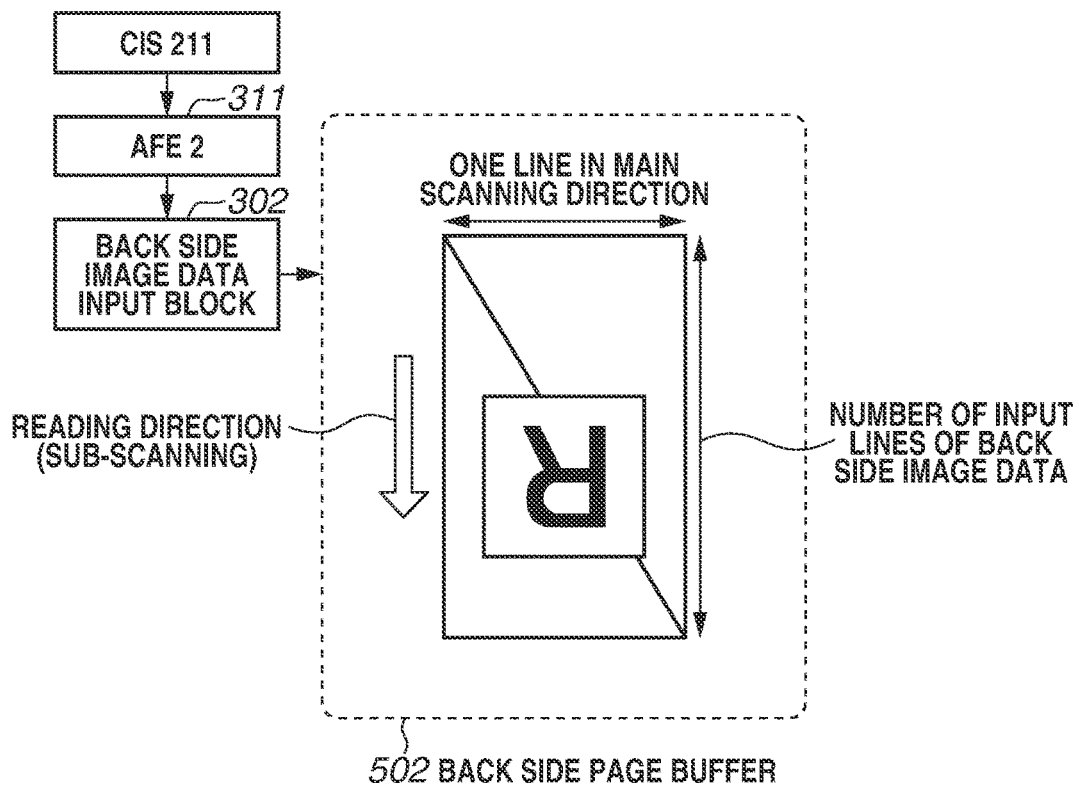
FIGS. 7A and 7B are diagrams illustrating a valid range of back side input image data.
Figure 7B:
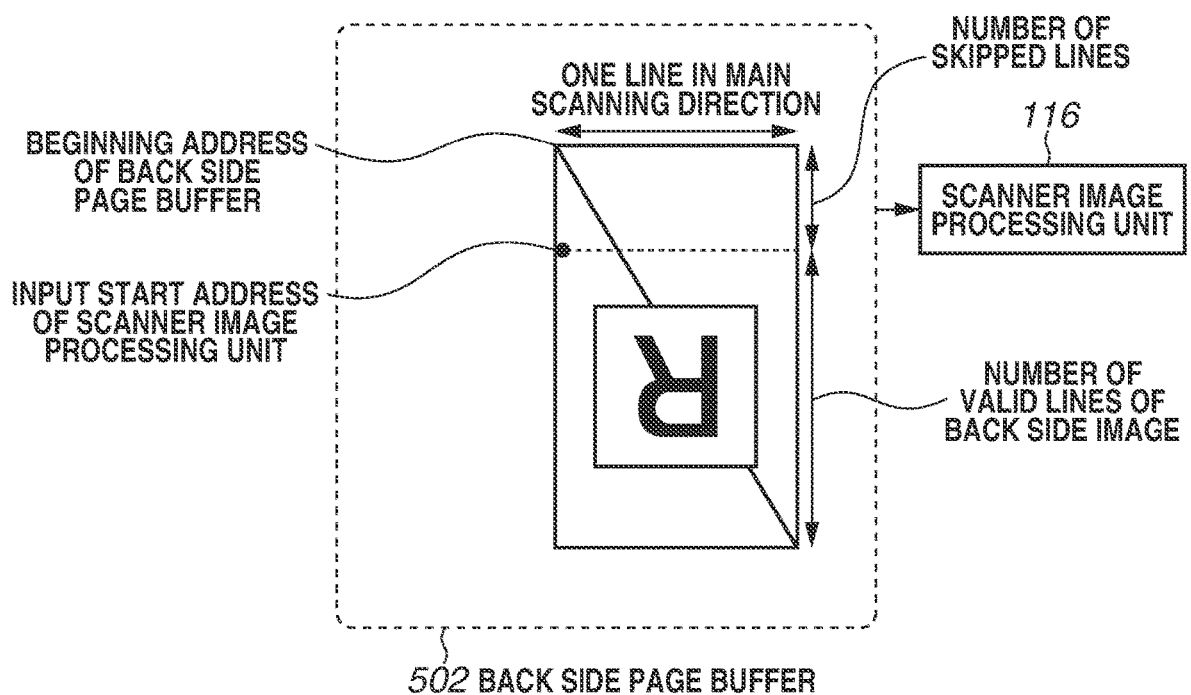

FIGS. 7A and 7B are diagrams illustrating examples of back side input image data temporarily accumulated in the back side page buffer 502 and an image range (a valid image range) input to the scanner image processing unit 116 in the image data when the processing in FIG. 6 is executed.

FIGS. 8A to 11B are diagrams illustrating examples of output images output when the processing in FIG. 6 is executed. FIGS. 8A to 9B illustrate examples of output images when two-sided reading is executed by specifying a "letter (LTR) size" as a document size (a specified document size) in scan mode settings (reading settings), for a document the actual document size of which is a "legal (LGL) size". Further, FIGS. 10A to 11B illustrate examples of output images when two-sided reading is executed by specifying the "LTR size" as the specified document size for a document the actual document size of which is the "LTR size".

The examples illustrated in FIGS. 8A to 9B are examples where the "specified document size" is smaller than the "actual document size". Thus, an image range (an invalid image) not to be included in a final output image is included in the actual document. The image forming apparatus 101 according to the present embodiment omits the output or the input of the invalid image in any of steps in an image reading process and generates a final output image. In FIGS. 8A to 9B, the thus omitted invalid image is indicated by a "shaded area". For example, in FIG. 8A, a "shaded area" in a lower portion of a "scanner I/F output image" of a document front side indicates an image that is not read by the scanner 114 and not output from the scanner I/F 109. Further, in FIG. 8B, a "shaded area" in a lower portion of a "scanner image processing unit input image" of a document back side indicates an image that is skipped in the back side page buffer 502 and not input to the scanner image processing unit 116.

The processing illustrated in FIGS. 6A and 6B is started and executed by the CPU 103, for example, in a case where the user places a document on the ADF 207, or the user gives an instruction to use a document reading function through the operation unit 112.

First, in step S601, the CPU 103 receives the input (specifying) of scan mode settings (reading settings) from the user through the operation unit 112. At this time, the CPU 103 receives the specifying of reading settings such as a color mode (color or monochrome), a two-sided mode (on or off), a document orientation (vertically long or horizontally long), an opening direction (top-bottom opening or left-right opening), and a document size. In the following, "document orientation: vertically long" indicates a vertically long document (a portrait document), and "document orientation: horizontally long" indicates a horizontally long document (a landscape document). Further, "opening direction: top-bottom opening" indicates a document subjected to two-sided printing so that in a case where the document is turned over about the upper end (or the lower end) of the document, the top-bottom directions of images are the same on both sides of the document (a top-bottom opening document). "Opening direction: left-right opening" indicates a document subjected to two-sided printing so that in a case where the document is turned over about the left end (or the right end) of the document, the top-bottom directions of images are the same on both sides of the document (a left-right opening document).

For example, in the examples of FIGS. 8A and 10A, "document orientation: vertically long", "opening direction: left-right opening", and "document size: LTR" are specified. Further, in the examples of FIGS. 8B and 10B, "document orientation: vertically long", "opening direction: top-bottom opening", and "document size: LTR" are specified. Further, in the examples of FIGS. 9A and 11A, "document orientation: horizontally long", "opening direction: left-right opening", and "document size: LTR" are specified. Further, in the examples of FIGS. 9B and 11B, "document orientation: horizontally long", "opening direction: top-bottom opening", and "document size: LTR" are specified.

Further, in step S602, the CPU 103 receives a scanning start instruction from the user. If the user places a document on the ADF 207 of the scanner 114 and gives an instruction to start scanning through the operation unit 112, the CPU 103 detects the instruction, and the processing proceeds to step S603.

In step S603, the CPU 103 sets as a front side image size the document size (the specified document size) received in step S601.

Next, in step S604, for the front side image data input block 301 of the scanner I/F 109, the CPU 103 sets parameters for inputting read image data in the front side image size set in step S603. Further, in step S605, for the scanner image processing unit 116, the CPU 103 sets parameters for performing image processing on the read image data in the front side image size.

Further, in step S606, the CPU 103 sets as a back side image size the document size (the specified document size) received in step S601. Further, in step S607, the CPU 103 sets a back side image front adjustment mode to "off". The back side image front adjustment mode is used to set whether to perform skipping described below. If the back side image front adjustment mode is "off", skipping is not to be performed. If the back side image front adjustment mode is "on", skipping is to be performed.

Then, in steps S608 to S610, the CPU 103 determines the setting contents (the reading settings) of the document orientation and the opening direction received in step S601.

First, if it is determined that "document orientation: vertically long" and "opening direction: top-bottom opening" are specified (corresponding to FIG. 8B or 10B) (YES in step S608 and YES in step S609), the processing proceeds to step S611. Further, also if it is determined that "document orientation: horizontally long" and "opening direction: left-right opening" are specified (corresponding to FIG. 9A or 11A) (NO in step S608 and YES in step S610), the processing proceeds to step S611.

As described above, if "document orientation: vertically long" and "opening direction: top-bottom opening" are specified, or "document orientation: horizontally long" and "opening direction: left-right opening" are specified, the positional relationship between a reading reference end (the front end of the document in the conveying direction) and an image reference end (the upper end of an image on the document) of the document is different between the front and back sides (FIGS. 8B and 9A). Thus, in such a case, as illustrated in FIG. 7A, the entire back side of the document is read and saved in the back side page buffer 502. Then, as illustrated in FIG. 7B, when the back side is read from the back side page buffer 502, an unnecessary portion (an invalid range) is skipped, and only a necessary portion (a valid range) is input to the scanner image processing unit 116. Preparation for this process is made in steps S611 and S612.

In step S611, the CPU 103 updates the setting of the back side image size set in step S606 to a maximum document size that can be read by the image forming apparatus 101, and the processing proceeds to step S612. In the image forming apparatus 101 according to the present embodiment, the maximum document size that can be read is the "LGL" size. Consequently, even if the actual document size is larger than the specified document size, the entire back side of the document can be read and saved in the back side page buffer 502. Further, in step S612, the CPU 103 sets the back side image front adjustment mode to "on", and the processing proceeds to step S613. Consequently, as illustrated in FIG. 7B, when reading the back side from the back side page buffer 502, the mode of skipping an unnecessary portion and inputting only a necessary portion to the scanner image processing unit 116 is set.

Further, if it is determined in steps S608 to S610 that "document orientation: vertically long" and "opening direction: left-right opening" are specified (corresponding to FIG. 8A or 10A) (YES in step S608 and NO in step S609), the processing proceeds to step S613. Further, also if it is determined in steps S608 to S610 that "document orientation: horizontally long" and "opening direction: top-bottom opening" are specified (corresponding to FIG. 9B or 11B) (NO in step S608 and NO in step S610), the processing proceeds to step S613.

As described above, if "document orientation: vertically long" and "opening direction: left-right opening" are specified, or "document orientation: horizontally long" and "opening direction: top-bottom opening" are specified, then as illustrated in FIGS. 8A and 9B, the positional relationship between the reading reference end and the image reference end of the document is the same between the front and back sides. Thus, the back side can also be subjected to processing similar to that on the front side, and therefore, the processes of steps S611 and S612 are not necessary. Thus, steps S611 and S612 are skipped, and the processing proceeds to step S613.

Next, in step S613, the CPU 103 obtains from the RAM 105 the back side page buffer 502 in a memory size corresponding to the amount of image data in the back side image size set in steps S606 and S611.

Next, in step S614, for the back side image data input block 302 of the scanner I/F 109, the CPU 103 sets parameters for inputting image data in the back side image size set in steps S606 and S611.

That is, to read a document corresponding to FIG. 8A or 9B, the back side page buffer 502 in a memory size corresponding to the amount of image data in the specified document size (LTR in this case) is obtained, and a setting for inputting data in this size is made. Further, to read a document corresponding to FIG. 8B or 9A, the back side page buffer 502 in a memory size corresponding to the amount of image data in the actual document size (LGL in this case) is obtained, and a setting for inputting data in this size is made. As described above, in steps S608 to S614, the reading settings are determined, thereby determining whether the positional relationship between the front end of the document in the conveying direction and the upper end of an image on the document differ between both sides of the document. Further, based on the determination result, control for determining the reading range of the back side image reading unit (the CIS 221) is performed.

Then, in step S615, the CPU 103 starts image processing on front side image data by the scanner image processing unit 116. Further, in step S616, the CPU 103 starts an input process of each of image data of the front side and image data of the back side by the scanner I/F 109. Consequently, the conveyance of a document stacked in the document tray 205 is started.

After the processes of steps S615 and S616, the CPU 103 performs in parallel the input process and the image processing on the front side image data, which are illustrated in steps S617 to S621, and the input process of the back side image data, which is illustrated in steps S622 to S626.

<Input Process and Image Processing on Front Side Image Data (Steps S617 to S621)>

First, the input process and the image processing on the front side image data (steps S617 to S621) will be described. In step S617, the CPU 103 determines whether the input of the front side image data to the front side image data input block 301 of the scanner I/F 109 is completed. In the image forming apparatus 101 according to the present embodiment, if the input of image data corresponding to the front side image size set in step S603 is completed, it is determined that the input of the front side image data is completed.

If it is determined in step S617 that the input of the front side image data is completed (YES in step S617), the processing proceeds to step S619. In step S619, the CPU 103 stops the processing of the front side image data input block 301 of the scanner I/F 109, and the processing proceeds to step S620.

If, on the other hand, it is determined that the input of the front side image data is not yet completed (NO in step S617), the processing proceeds to step S618. In step S618, the CPU 103 determines whether the sheet rear end of the document is detected by the ADF 207 of the scanner 114. If it is determined that the sheet rear end of the document is not detected (NO in step S618), the processing returns to step S617. If, on the other hand, it is determined that the sheet rear end of the document is detected (YES in step S618), then in step S619, the CPU 103 stops the processing of the front side image data input block 301 of the scanner I/F 109, and the processing proceeds to step S620.

Next, in step S620, the CPU 103 determines whether the image processing on the front side image data by the scanner image processing unit 116 is completed. In the image forming apparatus 101 according to the present embodiment, if image processing on image data equivalent to the image size of the image data input to the front side image data input block 301 of the scanner I/F 109 is completed, it is determined that the image processing on the front side is completed.

If it is determined in step S620 that the image processing on the front side image data by the scanner image processing unit 116 is not yet completed (NO in step S620), the CPU 103 waits for the completion of the image processing on the front side in step S620. If, on the other hand, it is determined that the image processing on the front side image data by the scanner image processing unit 116 is completed (YES in step S620), the processing proceeds to step S621. In step S621, the CPU 103 stops the processing of the scanner image processing unit 116 and ends the input process and the image processing on the front side image data (steps S617 to S621).

As described above, in the input process of the front side image data, the front side image data can be read such that the document size set in step S603 (i.e., the specified document size received in step S601) is the upper limit. Further, in the image processing on the front side image data, the image processing on the front side image data by the scanner image processing unit 116 can be executed such that the document size set in step S603 (i.e., the specified document size received in step S601) is the upper limit. For example, as illustrated in FIG. 8A, an image in the LTR size is read from the front side of a document in the LGL size, subjected to image processing, and output.

<Input Process on Back Side Image Data (Steps S622 to S626)>

Next, the input process of the back side image data (steps S622 to S626) will be described. In step S622, the CPU 103 determines whether the back side image front adjustment mode is "on". If it is determined that the back side image front adjustment mode is "on" (YES in step S622), the processing proceeds to step S623.

In step S623, the CPU 103 determines whether the sheet rear end of the document is detected by the ADF 207 of the scanner 114. If it is determined that the sheet rear end of the document is not yet detected (NO in step S623), the CPU 103 waits until the sheet rear end of the document is detected in step S623. If, on the other hand, it is determined that the sheet rear end of the document is detected (YES in step S623), the processing proceeds to step S626. In step S626, the CPU 103 stops the processing of the back side image data input block 302 of the scanner I/F 109.

Further, if it is determined in step S622 that the back side image front adjustment mode is not "on" (NO in step S622), the processing proceeds to step S624. In step S624, the CPU 103 determines whether the input of the back side image data is completed. In the image forming apparatus 101 according to the present embodiment, if the input of image data corresponding to the back side image size set in steps S606 and S611 is completed, it is determined that the input of the back side image data is completed.

If it is determined that the input of the back side image data is completed (YES in step S624), then in step S626, the CPU 103 stops the processing of the back side image data input block 302 of the scanner I/F 109.

If, on the other hand, it is determined that the input of the back side image data is not yet completed (NO in step S624), the processing proceeds to step S625. In step S625, the CPU 103 determines whether the sheet rear end of the document is detected by the ADF 207 of the scanner 114. If it is determined that the sheet rear end of the document is not yet detected (NO in step S625), the processing returns to step S624.

If, on the other hand, it is determined that the sheet rear end of the document is detected (YES in step S625), then in step S626, the CPU 103 stops the processing of the back side image data input block 302 of the scanner I/F 109.

After step S626, the CPU 103 ends the input process of the back side image data (steps S622 to S626).

As described above, if the back side image front adjustment mode is "on", the back side image data in the actual document size can be read. For example, as illustrated in FIG. 8B or 9A, an image in the LGL size is read from the back side of a document in the LGL size and stored in the back side page buffer 502. Further, if the back side image front adjustment mode is "off", then in the input process of the back side image data, the back side image data can be read such that the document size set in step S606 (i.e., the specified document size received in step S601) is the upper limit. For example, as illustrated in FIG. 8A or 9B, an image in the LTR size is read from the back side of a document in the LGL size and stored in the back side page buffer 502.

After the input process and the image processing on the front side image data, which are illustrated in steps S617 to S621, and the input process of the back side image data, which is illustrated in steps S622 to S626, are all completed (i.e., after the above parallel processing is completed), the processing proceeds to step S627.

In step S627, the CPU 103 acquires the value of a document sub-scanning length. Specifically, by the input processes of the image data of the front side and the image data of the back side, and based on the difference between the timings when the document detection sensor 220 detects the front and rear ends of the document 208 in a case where the ADF 207 conveys the document 208, the CPU 103 calculates (detects) the document sub-scanning length.

Then, in steps S628 to S633, the CPU 103 calculates a back side skipping amount. The back side skipping amount indicates the number of lines to be skipped in the back side image data temporarily accumulated in the back side page buffer 502. The details will be described below.

In step S628, the CPU 103 determines whether the document sub-scanning length acquired in step S627 (the actual document size) exceeds the document size received in step S601 (the specified document size). If it is determined in step S628 that the document sub-scanning length acquired in step S627 does not exceed the document size received in step S601 (e.g., corresponding to the examples of FIGS. 10A to 11B) (NO in step S628), the processing proceeds to step S632. In step S632, the CPU 103 updates the back side image size to a document size corresponding to the document sub-scanning length acquired in step S627. Next, in step S633, the CPU 103 sets the back side skipping amount to and the processing proceeds to step S634. If "specified document size"≥"actual document size", the entire actual document is included in a final output image. Thus, skipping is not necessary.

Further, if it is determined in step S628 that the document sub-scanning length acquired in step S627 exceeds the document size received in step S601 (e.g., corresponding to the examples of FIGS. 8A to 9B) (YES in step S628), the processing proceeds to step S629. In step S629, the CPU 103 updates the back side image size set in steps S606 and S611 to the document size received in step S601 (the specified document size).

Next, in step S630, the CPU 103 determines whether the back side image front adjustment mode is "on". If it is determined in step S630 that the back side image front adjustment mode is not "on" (NO in step S630), the processing proceeds to step S633. In step S633, the CPU 103 sets the back side skipping amount to "0", and the processing proceeds to step S634. If "specified document size"<"actual document size" and "back side image front adjustment mode=off", then as illustrated in FIGS. 8A and 9B, an invalid image is already removed in an output image from the scanner I/F 109. Thus, skipping is not necessary.

If, on the other hand, it is determined that the back side image front adjustment mode is "on" (YES in step S630), the processing proceeds to step S631. In step S631, the CPU 103 calculates the back side skipping amount from the difference between the document sub-scanning length acquired in step S627 and the document size received in step S601 and sets the calculated back side skipping amount (see FIG. 7B), and the processing proceeds to step S634. If "specified document size"<"actual document size" and "back side image front adjustment mode=on", then as illustrated in FIGS. 8B and 9A, an invalid image is included in an output image from the scanner I/F 109. Thus, it is necessary to remove the invalid image by skipping, thereby acquiring a valid image.

As described above, based on the result of determining whether the positional relationship between the front end of the document in the conveying direction and the upper end of an image on the document differ between both sides of the document, and the amount of difference in the document conveying direction between the specified document size and the detected document size, the back side skipping amount is determined. Then, control for determining the valid range of the back side image data as a range excluding the back side skipping amount (an invalid range) is performed.

Next, in step S634, the CPU 103 sets parameters for performing image processing on the back side image data by the scanner image processing unit 116. At this time, the image size reset in step S629 or S632 is set as the back side image size.

Next, in step S635, based on the back side skipping amount set in step S631 or S633, the CPU 103 sets the skipping offset of the back side page buffer 502. Specifically, the CPU 103 obtains an address by adding to the beginning address of the back side page buffer 502 an offset size obtained by multiplying the back side skipping amount (the number of lines) by an image size (a memory size) per line. Further, the CPU 103 makes image data input settings for the scanner image processing unit 116 so that the back side image data is read from the obtained address.

Next, in step S636, the CPU 103 starts image processing on the back side by the scanner image processing unit 116.

Next, in step S637, the CPU 103 determines whether the image processing on the back side by the scanner image processing unit 116 is completed. If it is determined in step S637 that the image processing on the back side is not yet completed (NO in step S637), the CPU 103 waits for the completion of the image processing on the back side in step S637.

If, on the other hand, it is determined that the image processing on the back side is completed (YES in step S637), the processing proceeds to step S638. In step S638, the CPU 103 stops the processing of the scanner image processing unit 116.

Next, in step S639, the CPU 103 releases the back side page buffer 502 and ends the reading process on the document.

FIGS. 8A to 11B will now be described.

As described above, FIGS. 8A to 9B illustrate examples of output images when two-sided reading is executed by specifying the LTR size as the document size for a document the actual document size of which is the LGL size. Further, FIGS. 10A to 11B illustrate examples of output images when two-sided reading is executed by specifying the LTR size as the document size for a document the actual document size of which is the LTR size.

FIG. 8A represents output images in a case where the image orientation of a document is "vertically long", and the opening direction of the document is "left-right opening". In this case, the actual document size is longer than the specified document size. However, the positional relationship between the reading reference end and the image reference end is the same between the front and back sides.

Thus, similarly to the front side, the reading range of the back side is set to the specified document size, whereby, when the back side is read, an unnecessary image is removed, and only a valid image is stored in the back side page buffer 502. Thus, the valid range of the back side image data in the back side page buffer 502 is determined as a range corresponding to the specified document size from the beginning address of the back side page buffer 502, and the skipping amount is "0". That is, in this case, skipping is not performed.

FIG. 8B represents output images in a case where the image orientation of a document is "vertically long", and the opening direction of the document is "top-bottom opening". In this case, the actual document size is longer than the specified document size. Further, the positional relationship between the reading reference end and the image reference end is different between the front and back sides. Thus, the reading range of the back side is set to the actual document size, and an image in the actual document size (including an invalid image) is stored in the back side page buffer 502 as illustrated in FIG. 7A. Thus, as illustrated in FIG. 7B, it is necessary to skip the number of lines corresponding to the amount of difference between the document size and the specified document size. That is, the valid range of the back side image data is determined as a range corresponding to the specified document size from an address obtained by adding the amount of difference between the actual document size and the specified document size to the beginning address of the back side page buffer 502. The range from the beginning address to the address obtained by adding the amount of difference between the actual document size and the specified document size to the beginning address is the skipping amount, and skipping is performed as illustrated in FIG. 7B. Then, only a valid image is input to the scanner image processing unit 116.

FIG. 9A represents output images in a case where the image orientation of a document is "horizontally long", and the opening direction of the document is "left-right opening". This case is similar to FIG. 8B.

FIG. 9B represents output images in a case where the image orientation of a document is "horizontally long", and the opening direction of the document is "top-bottom opening". This case is similar to FIG. 8A.

FIG. 10A represents output images in a case where the image orientation of a document is "vertically long", and the opening direction of the document is "left-right opening". FIG. 10B represents output images in a case where the image orientation of a document is "vertically long", and the opening direction of the document is "top-bottom opening".

FIG. 11A represents output images in a case where the image orientation of a document is "horizontally long", and the opening direction of the document is "left-right opening". FIG. 11B represents output images in a case where the image orientation of a document is "horizontally long", and the opening direction of the document is "top-bottom opening".

In the cases of all FIGS. 10A to 11B, the LTR size is specified as the document size for a document the actual document size of which is the LTR size. The actual document size is thus the same as the specified document size. Thus, an unnecessary image is not included in the document, regardless of the positional relationship between the reading reference end and the image reference end on the front and back sides, and only a valid image is stored in the back side page buffer 502. Thus, the valid range of the back side image data in the back side page buffer 502 is determined as a range corresponding to the specified document size from the beginning address of the back side page buffer 502, regardless of the positional relationship between the reading reference end and the image reference end on the front and back sides, and the skipping amount is "0". That is, in this case, skipping is not performed.

As described above, according to the present embodiment, a two-sided image reading apparatus having limitations on hardware resources such as an image processing processor and a memory has the following effects. For a two-sided document in which the positional relationship between a reading reference end and an image reference end is different between the front and back sides, it is possible to output a back side image corresponding to the output position or the output range of a front side image, and thereby a desired output result is obtained. That is, with a simple configuration, it is possible to output a back side image corresponding to the output position or the output range of a front side image, and thereby a desired output result is obtained.

The configurations and the contents of the above-mentioned various types of data are not limited to these, and the above-mentioned various types of data may have various configurations and contents according to the use and purpose.

While one embodiment has been described, the present embodiment can also be embodied as, for example, a system, an apparatus, a method, a program, and a storage medium. Specifically, the present embodiment may be applied to a system including a plurality of devices or may be applied to an apparatus including a single device.

Further, all the configurations obtained by combining the above embodiments are also included in the present embodiment.

The present embodiment can also be achieved by the process of supplying a program for achieving one or more functions of the above embodiments to a system or an apparatus via a network or a storage medium, and of causing one or more processors of a computer of the system or the apparatus to read and execute the program. Further, the present embodiment can also be achieved by a circuit (e.g., an application-specific integrated circuit (ASIC)) for achieving the one or more functions.

Further, the present embodiment may be applied to a system including a plurality of devices or may be applied to an apparatus including a single device.

The embodiment discussed in the specification is not limited to the above embodiment. Various modifications (including the organic combinations of the embodiments) can be made based on the spirit of the present disclosure, but are not excluded from the scope of the embodiment discussed in the specification. That is, all the configurations obtained by combining the above embodiments and variations of the embodiments are also included in the present disclosure.

According to the present disclosure, with a simple configuration, it is possible to output a back side image corresponding to the output position or the output range of a front side image, and thereby a desired output result is obtained.

Other Embodiments

Embodiment(s) can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to embodiments, it is to be understood that the invention is not limited to the disclosed embodiments. The scope of the following claims is to be accorded the broadest interpretation so as to encompass all such modifications and equivalent structures and functions.

What is claimed is:

1. An image processing apparatus capable of reading both sides of a document conveyed by a conveyor, the image processing apparatus comprising:
    a user interface that receives a size and receives an orientation of an image of the document from at least a portrait orientation and a landscape orientation; and
    a controller that selects, based on the orientation received by the user interface, whether to operate in a first mode or in a second mode,
    wherein a first output image in each of the first mode and the second mode is an image of the received size on a leading edge side in a conveying direction for a first side of the document,
    wherein a second output image in the first mode is an image of the received size on the leading edge side in the conveying direction for a second side of the document, and
    wherein a second output image in the second mode is an image of the received size on a trailing edge side in the conveying direction for the second side of the document.

2. The image processing apparatus according to claim 1, wherein the user interface further receives an opening direction of the document, and
    wherein the controller selects whether to operate in the first mode or in the second mode based on the orientation received by the user interface and the opening direction received by the user interface.

3. The image processing apparatus according to claim 2, wherein the user interface receives setting whether to open horizontally or to open vertically.

4. The image processing apparatus according to claim 1, wherein, in the first mode, the image of the received size on the leading edge side in the conveying direction for the first side of the document is read, and the rest of an area for the first side of the document is not read, and the image of the received size on the leading edge side in the conveying direction for the second side of the document is read, and the rest of an area for the second side of the document is not read.

5. The image processing apparatus according to claim 1, further comprising a detector that detects a size of the document conveyed by the conveyor,
    wherein, in the second mode, for the second side of the document, an area of the detected size from the leading edge side in the conveying direction is read, and an image of the received size from the trailing edge side in the conveying direction is outputted.

6. The image processing apparatus according to claim 5, wherein the conveyor conveys the document along a conveyance path, and
    wherein the detector detects the size of the document conveyed along the conveyance path.

7. The image processing apparatus according to claim 1, wherein the image processing apparatus outputs the first output image in the first mode and in the second mode and the second output image in the first mode and in the second mode.

8. The image processing apparatus according to claim 7, wherein the image processing apparatus outputs the first output image and the second output image to an external device.

9. The image processing apparatus according to claim 7, wherein the image processing apparatus prints the first output image and the second output image.

10. A method for controlling an image processing apparatus capable of reading both sides of a document conveyed by a conveyor, the method comprising:
    receiving a size and receiving an orientation of an image of the document from at least a portrait orientation and a landscape orientation; and
    selecting, based on the orientation, whether to operate in a first mode or in a second mode,
    wherein a first output image in each of the first mode and the second mode is an image of the received size on a leading edge side in a conveying direction for a first side of the document,
    wherein a second output image in the first mode is an image of the received size on the leading edge side in the conveying direction for a second side of the document, and
    wherein a second output image in the second mode is an image of the received size on a trailing edge side in the conveying direction for the second side of the document.

11. A non-transitory computer-readable storage medium storing a program for causing a computer to perform a method for controlling an image processing apparatus capable of reading both sides of a document conveyed by a conveyor, the method comprising:
    receiving a size and receiving an orientation of an image of the document from at least a portrait orientation and a landscape orientation; and
    selecting, based on the orientation, whether to operate in a first mode or in a second mode,
    wherein a first output image in each of the first mode and the second mode is an image of the received size on a leading edge side in a conveying direction for a first side of the document,
    wherein a second output image in the first mode is an image of the received size on the leading edge side in the conveying direction for a second side of the document, and wherein a second output image in the second mode is an image of the received size on a trailing edge side in the conveying direction for the second side of the document.

12. An image processing apparatus comprising:
a reader that reads both sides of a document conveyed by a conveyor; and
a user interface that receives a size, receives an opening direction, and receives an orientation of the document from at least a portrait orientation and a landscape orientation,
wherein, in a case where the user interface receives the landscape orientation as the orientation of the document and top-bottom opening as the opening direction, a first output image is an image of the received size on a leading edge side in a conveying direction for a first side of the document, and a second output image in the first mode is an image of the received size on the leading edge side in the conveying direction for a second side of the document.

13. The image processing apparatus according to claim 12, wherein the image processing apparatus outputs the first output image and the second output image.

14. The image processing apparatus according to claim 13, wherein the image processing apparatus outputs the first output image and the second output image to an external device.

15. The image processing apparatus according to claim 13, wherein the image processing apparatus prints the first output image and the second output image.

* * * * *